(12) United States Patent
Nakayama et al.

(10) Patent No.: US 7,245,689 B2
(45) Date of Patent: Jul. 17, 2007

(54) NUCLEAR REACTOR INTERNAL STRUCTURE

(75) Inventors: Katsuyuki Nakayama, Kobe (JP); Kenji Umeda, Kobe (JP); Teruyuki Nagano, Kobe (JP); Daigo Fujimura, Takasago (JP)

(73) Assignee: Mitsubishi Heavy Industries, Ltd, Tokyo (JP)

( * ) Notice: Subject to any disclaimer, the term of this patent is extended or adjusted under 35 U.S.C. 154(b) by 0 days.

(21) Appl. No.: 10/867,686

(22) Filed: Jun. 16, 2004

(65) Prior Publication Data

US 2007/0133732 A1    Jun. 14, 2007

(30) Foreign Application Priority Data

| Jun. 18, 2003 | (JP) | ............... 2003-173980 |
| Jun. 26, 2003 | (JP) | ............... 2003-182685 |
| Jul. 1, 2003  | (JP) | ............... 2003-189645 |
| Jul. 2, 2003  | (JP) | ............... 2003-190061 |

(51) Int. Cl.
    *G21C 1/04* (2006.01)

(52) U.S. Cl. ............ 376/352; 376/399; 376/395; 376/365

(58) Field of Classification Search ........... 376/352, 376/399, 361, 365, 393, 395
See application file for complete search history.

(56) References Cited

U.S. PATENT DOCUMENTS 3,623,948 A * 11/1971 Dotson et al. ............ 376/352
3,864,209 A *  2/1975 Tong ........................ 376/352
4,080,252 A *  3/1978 Redding .................... 376/281
5,267,285 A * 11/1993 Ekeroth et al. ........... 376/352

FOREIGN PATENT DOCUMENTS

| JP | 6-59072 A   |   | 3/1994  |
| JP | 08-15476    | * | 1/1996  |
| JP | 8062372 A   |   | 3/1996  |
| JP | 2529888     |   | 12/1996 |
| JP | 2554062 Y2  |   | 7/1997  |
| JP | 2999124 B2  |   | 11/1999 |
| JP | 3193532 B2  |   | 5/2001  |

* cited by examiner

*Primary Examiner*—Ricardo J. Palabrica
(74) *Attorney, Agent, or Firm*—Birch, Stewart, Kolasch & Birch, LLP

(57) ABSTRACT

In a nuclear reactor internal structure, generation and promotion of object-downstream separating vortices are suppressed so that coolant uniformly flows in a reactor core and pressure loss of flow of the coolant is reduced so that the flow of the coolant is stabilized. A lower connecting plate 30 arranged in a lower plenum 8 comprises a ring portion 31 in which an arcuate portion 32 and a cut-off portion are alternately formed. An outer peripheral portion of the ring portion 31 is asymmetric relative to a flow direction of main flow and also asymmetric relative to a separating flow generation direction.

5 Claims, 19 Drawing Sheets

Fig. 15 (a)
Fig. 15 (b)
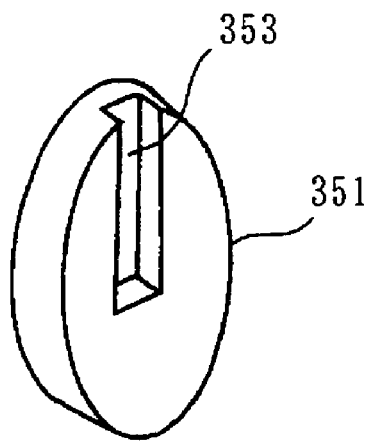
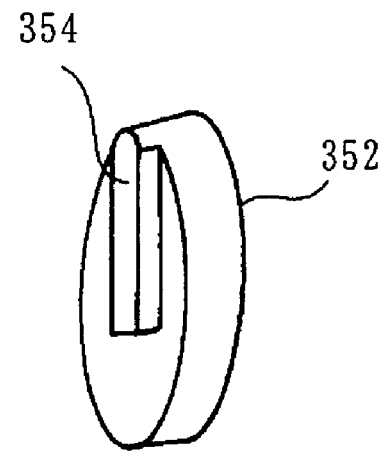
Fig. 16
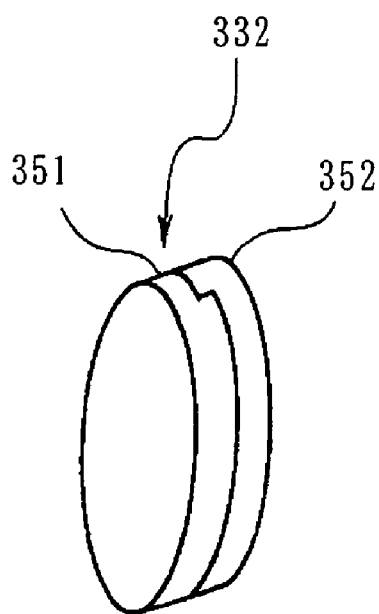

Fig. 22 (Prior Art)
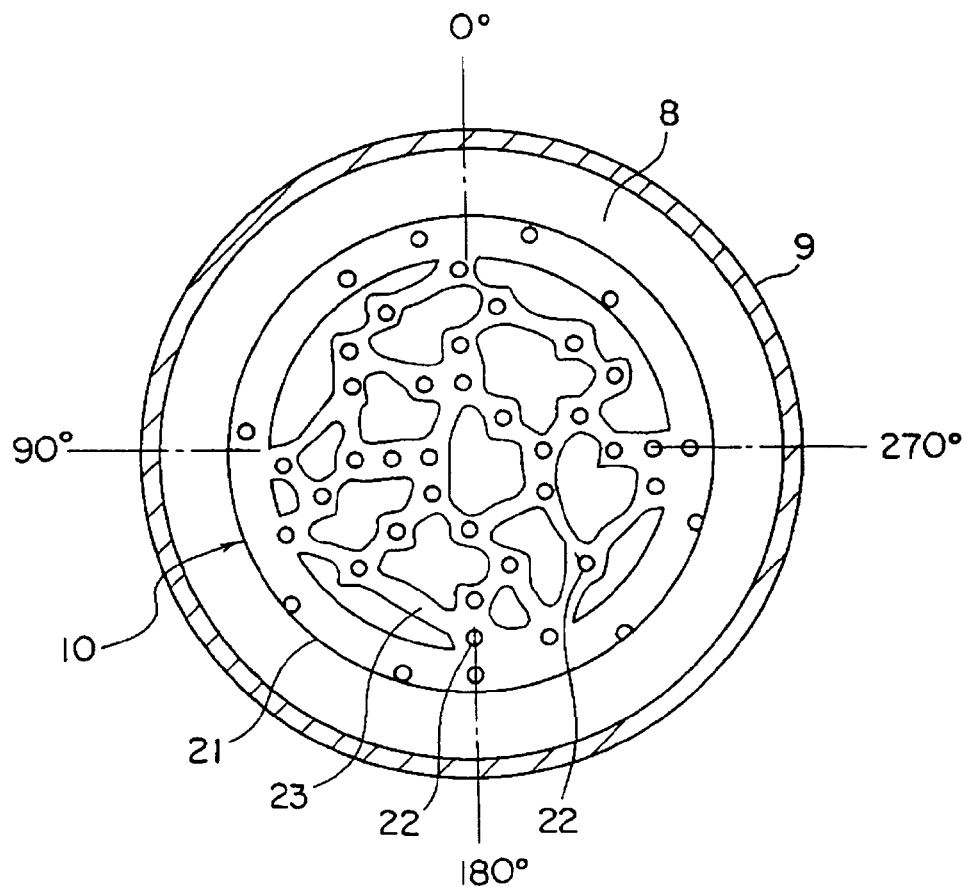
Fig. 23 (a) (Prior Art)
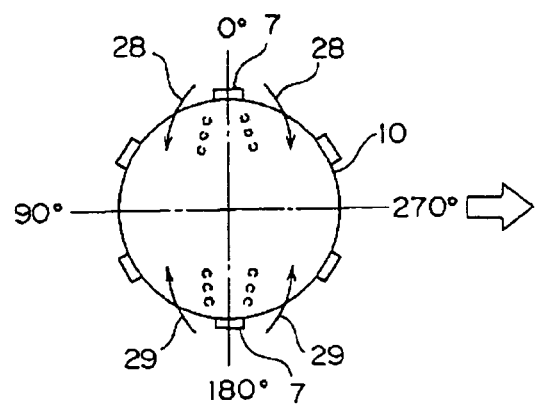
Fig. 23 (b) (Prior Art)
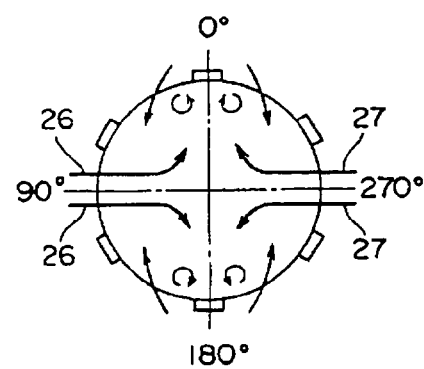

NUCLEAR REACTOR INTERNAL STRUCTURE

This Nonprovisional application claims priority under 35 U.S.C. § 119(a) on Patent Application No(s). 2003-173980; 2003-182685; 2003-189645 and 2003-190061 filed in JAPAN on Jun. 18, 2003; Jun. 26, 2003; Jul. 1, 2003 and Jul. 2, 2003; respectively, the entire contents of which are hereby incorporated by reference.

BACKGROUND OF THE INVENTION

1. Field of the Invention

The present invention generally relates to a nuclear reactor internal structure and more specifically to an internal structure and coolant supply structure of a pressurized water reactor by which flow of coolant in the reactor can be rectified.

2. Description of the Related Art

As a conventional technology relating to a nuclear reactor internal structure by which flow of coolant can be rectified, there are known the following patent documents, that is, the Japanese patent publication Nos. 2999124 (pages 2 and 3, FIGS. 3 and 4) and 3193532 (pages 3 and 4, FIGS. 2 and 3) and the Japanese laid-open patent application Hei 8-62372 (page 2, FIG. 4). In these documents, a connecting plate having its outer periphery formed in a circular shape is disclosed. A basic structure of a reactor vessel of a pressurized water reactor in which such a connecting plate is used is shown here in FIG. 19. In FIG. 19, coolant 1 flows in through a coolant inlet nozzle 3 that is integrally formed with a reactor vessel 2 and flows down as a downflow 6 in a downflow path portion or a downcomer portion 5 formed in an annular shape between the reactor vessel 2 and a reactor core tank 4. The downflow 6 passes through a radial key portion 7 provided having a key groove structure for positioning a lower portion of the reactor core tank 4 relative to the reactor vessel 2 and enters a lower plenum 8. Then, the coolant 1 is directed upward by a spherical inner surface 9 of the lower plenum 8 to pass through a lower connecting plate 10, upper connecting plate 11, lower reactor core supporting plate 12, etc. and flows in a reactor core 13.

An upflow 14 that has entered the reactor core 13 absorbs heat generated by a fuel assembly 15 in the reactor core 13 to be heated to a high temperature and passes through a coolant outlet nozzle 17 in an upper plenum 16 to flow out to a steam generator (not shown). Then, the coolant 1 transfers the heat to cooled water in the steam generator to heat and boil it and is again sent toward the nuclear reactor by a coolant circulating pump (not shown) to be returned into the reactor vessel 2 through the coolant inlet nozzle 3. In FIG. 19, numeral 4a designates a lower reactor core plate that supports the fuel assembly 15, numeral 19 a lower reactor core strut, numeral 20 a falling shock absorbing plate and numeral 20a an instrument guide pipe.

The mode of arrangement of the coolant inlet nozzle 3 and coolant outlet nozzle 17 is shown in FIG. 20 being a cross sectional view taken on line IIX—IIX of FIG. 19.

In FIG. 20, for convenience of description, an axis relative to which the coolant outlet nozzles 17 of an upper pair are positioned in symmetry to each other is defined as an angle 0° axis and each axis is designated by the angle counted counter-clockwise. Thus, on the opposite side of the coolant outlet nozzles 17 of the upper pair, the coolant outlet nozzles 17 of another pair are positioned in symmetry relative to the 180' axis. Also, the coolant inlet nozzles 3 of a pair are positioned in symmetry relative to the 90° axis and the coolant inlet nozzles 3 of another pair are positioned in symmetry relative to the 270' axis.

On the other hand, the mode of arrangement of the radial key portion 7 of a lower portion of the downcomer portion 5 is shown in FIG. 21 being a cross sectional view taken on line IX—IX of FIG. 19. As shown in FIG. 21, six of the radial key portions 7 are arranged at positions of 60° intervals starting from the reference of the 0° axis in the downcomer portion 5.

In FIG. 22 being a cross sectional view taken on line X—X of FIG. 19, the lower connecting plate 10 arranged in the lower plenum 8 is a circular plate-like member having its outer circumferential periphery formed in a ring shape as a ring portion 21. A circular inside portion of the ring portion 21 is formed by a rim portion 23 having a multiplicity of small holes 22 into which the instrument guide pipes 20a are inserted. The rim portion 23 spreads in a mesh form so as to surround and support these small holes 22 and connects to the ring portion 21.

Both of FIGS. 23(a) and (b) are views of the lower connecting plate 10 as seen from below in the lower plenum 8 and show the state of flow of the coolant 1 on the lower side of the lower connecting plate 10 in the lower plenum 8.

The coolant 1 flowing into the reactor through the coolant inlet nozzles 3 of one pair joins together so that the flow velocity thereof becomes faster and flows down in the downcomer portion 5, wherein a portion of the coolant 1 disperses in the circumferential direction in the downcomer portion 5.

Thus, the flow of the coolant 1 can be divided into two portions, that is, on one hand, a main flow 26, 27, as shown in FIG. 23(b), in which the coolant 1 flows down in the downcomer portion 5 substantially perpendicularly from the coolant inlet nozzle 3 and flows in toward a central portion of the lower plenum 8 through between the ring portion 21 of the lower connecting plate 10 and the inner surface 9 of the lower plenum 8 and, on the other hand, a dispersing flow in which flow of the coolant 1 disperses in the circumferential direction in the downcomer portion 5.

A portion of the dispersing flow, while it goes down, impinges on the radial key portion 7 to thereby form a separating flow 28, 29, as shown in FIG. 23(a), on both sides of the radial key portion 7 and this separating flow 28, 29 flows in toward the central portion of the lower plenum likewise through between the lower connecting plate 10 and the inner surface 9 of the lower plenum 8.

FIG. 23(a) shows the state of the separating flow 28, 29 on the lower side of the lower connecting plate 10 and the state of generation of small vortices, that is, object-downstream separating vortices caused by the separating flow 28, 29 around the radial key portion 7. Here, as the coolant 1 flows in the state of turbulence of a high Reynolds number, by the characteristic of the turbulence, the flow of the coolant 1 is in the state of a random velocity in which the small vortices repeat appearance/disappearance in the flow. If the impinging flow and the separating flow join together, while a further complicated flow is generated, there is also considered a possibility that the separating flow is stabilized or rather promoted or the small vortices are stabilized or rather promoted according to the mode of the joining.

FIG. 23(b) shows the state in which the main flow 26, 27 coming in from the 90° axis side and the 270° axis side, respectively, impinges on the separating flow around the central portion of the falling shock absorbing plate 20 to become the impinging flow separated into the 0° axis side and the 180° axis side and flows toward around the radial key portion 7. The separation is enlarged by the main flow 26, 27 coming in around the radial key portion 7 and the separating vortices are promoted so that the size of the separating vortices themselves becomes larger.

With respect to each pair of the coolant inlet nozzle 3 and the coolant outlet nozzle 17, adjacent to each other, the steam generator and the coolant pump, respectively, are connected to them, so that four loops of a primary cooling system are formed, wherein each of the coolant pumps generally has the same discharge rate.

FIG. 24 is a development view for explaining the structure of the downcomer portion 5, wherein an outer circumferential surface of the reactor core tank 4 of a cylindrical shape is developed into a flat plane.

On the outer circumferential surface of the reactor core tank 4, a thermal insulator 319 of a substantially rectangular shape is provided so as to slightly protrude into the downcomer portion 5. Between two adjacent thermal insulators 319, an inter-thermal insulator flow path 321, 322 of a substantially equal width is formed so that the coolant 1 flows down along this inter-thermal insulator flow path 321, 322.

Also, below the thermal insulator 319, there is provided a radial connection portion 7' of a substantially rectangular shape having a key groove structure for positioning the lower portion of the reactor core tank 4 relative to the reactor vessel 2 and by this radial connection portion 7', the reactor core tank 4 is connected to the reactor vessel 2 in the downcomer portion 5.

As shown in FIG. 19, the coolant 1 flows in from the coolant inlet nozzle 3 and flows down in the downcomer portion 5 as the downflow 6. In the downcomer portion 5, as shown in FIG. 24, the coolant 1 mainly flows down through the inter-thermal insulator flow path 321, 322 and enters the lower plenum 8 through between the radial connection portions 7'.

Here, the inter-thermal insulator flow path 321 is provided below the coolant inlet nozzle 3 and constitutes a main flow path through which the coolant 1 flows with a relatively fast velocity. On the other hand, in the inter-thermal insulator flow path 322 provided below the coolant outlet nozzle 17, the coolant 1 flows with a slower velocity than in the main flow path. Also, the radial connection portion 7' is located at a central position of the flow path 322, 321.

SUMMARY OF THE INVENTION (1) In the pressurized water reactor, while the coolant 1 flows down in the downcomer portion 5 and after passing through the lower plenum 8, flows up to enter the reactor core 13, if the above-mentioned separating vortices are generated and exist in the coolant 1, flow rate of the coolant 1 entering the reactor core 13 changes so that the flow becomes non-uniform. Also, pressure loss in the flow of the coolant 1 increases. Even if there is no specific problem in the output performance of the nuclear reactor, it is desirable to suppress the factor to cause such turbulences in order to maintain a stabilized flow and a good operation control.

Thus, in order to solve the above-mentioned problem, it is an bean aspect of the present invention to is to provide a nuclear reactor internal structure by which flow of the coolant 1 can be stabilized such that generation and promotion of the separating vortices, etc. including turbulent vortices are suppressed, the coolant 1 uniformly flows into the reactor core 13 and pressure loss of the flow of the coolant 1 is reduced.

(2) Also, if the separating vortices are stabilized or promoted, there are caused changes in the flow rate distribution of the coolant flowing up to enter the lower reactor core plate 4a. Even if there is no specific problem in the output performance of the nuclear reactor, it is desirable to eliminate the changes in the flow rate distribution in order to maintain a stable administration of the nuclear reactor.

Thus, in order to solve the present problem, another aspect of the present invention is to provide a nuclear reactor coolant circulation structure by which changes in the flow rate distribution can be eliminated so that a stable administration of the nuclear reactor is easily carried out.

(3) Yet another aspect of the present invention is to provide a nuclear reactor internal structure by which the separating flow and the impinging flow are prevented from randomly joining together in the lower plenum so that a stable flow in the reactor can be realized.

(4) Also, another aspect of the present invention is to provide a nuclear reactor internal structure by which generation of the separating flow and hence generation of the separating vortices can be suppressed and the separating flow and the impinging flow are prevented from randomly joining together so that a stable flow in the reactor can be realized.

In order to provide the foregoing aspects of the present invention, the present invention provides a nuclear reactor internal structure of a pressurized water reactor as follows;

(1) A nuclear reactor internal structure of a nuclear reactor comprising a coolant inlet nozzle, a pressure vessel of which bottom portion defines a lower plenum, a reactor core arranged in the pressure vessel, a reactor core tank arranged around the reactor core, a downcomer portion of an annular shape defined between the pressure vessel and the reactor core tank, a radial key portion provided in the downcomer portion for fixing the reactor core tank relative to the pressure vessel and a connecting plate provided in the lower plenum below the downcomer portion, wherein a flow of coolant introduced from the coolant inlet nozzle mostly flows down perpendicularly right below the coolant inlet nozzle without dispersing in the circumferential direction of the downcomer portion, the coolant flowing below the connecting plate through between an inner surface of the lower plenum and an outer peripheral portion of the connecting plate forms a main flow flowing toward the center of the lower plenum and the outer peripheral portion of the connecting plate is formed in an asymmetric shape relative to the direction of the main flow.

According to the present invention (1), in the interior of the nuclear reactor, the outer peripheral shape of the connecting plate is formed in the asymmetric shape relative to the direction of the main flow and thereby generation and promotion of a separating flow (object-downstream separating vortices) are suppressed, the coolant uniformly flows in the reactor core and pressure loss of the flow of the coolant can be reduced as well as the flow of the coolant can be stabilized. Also, the main flow and the separating flow are caused to impinge on each other without joining together (superimposing one on another) and thereby stabilization of turbulent vortices by joining of flow can be suppressed.

The above-mentioned nuclear reactor internal structure may be constructed such that the radial key portion is arranged in the direction deviating with a phase angle of 90' relative to the direction of the main flow, the flow of the coolant introduced from the coolant inlet nozzle partly deviates from the perpendicular direction in the downcomer portion to disperse in the circumferential direction of the downcomer portion and then flows down perpendicularly to impinge on the radial key portion to be separated there and further flows below the connecting plate through between the inner surface of the lower plenum and the outer peripheral portion of the connecting plate to form a separating flow flowing toward the direction deviating from the center of the lower plenum and the outer peripheral portion of the connecting plate is formed in an asymmetric shape relative to the direction of generation of the separating flow.

By employing such a construction, the outer peripheral shape of the connecting plate is formed in the asymmetric shape also relative to the direction of generation of the separating flow and thereby generation and promotion of the separating vortices can be further suppressed.

The outer peripheral portion of the connecting plate may be formed in a shape having an arcuate portion formed on one side relative to the direction of the main flow and a cut-off portion, in which an arcuate shape is cut off toward the center of the connecting plate, formed on the other side.

If the construction is so made, the outer peripheral shape of the connecting plate is formed such that, relative to the direction of the main flow, the arcuate portion is formed on one side and the cut-off portion, in which an arcuate shape is cut off toward the center of the connecting plate, is formed on the other side and thereby generation and promotion of the separating vortices can be suppressed by a simple structure.

The outer peripheral portion of the connecting plate may be formed in a shape having an arcuate portion formed on one side relative to the direction of generation of the separating flow and a cut-off portion, in which an arcuate shape is cut off toward the center of the connecting plate, formed on the other side.

According to this construction, the outer peripheral shape of the connecting plate is formed such that, relative to the direction of generation of the separating flow, the arcuate portion is formed on one side and the cut-off portion, in which an arcuate shape is cut off toward the center of the connecting plate, is formed on the other side and thereby generation and promotion of the separating vortices can be further suppressed.

The connecting plate may comprise a connecting plate main body and a separating vortices suppressing member having an arcuate shape, manufactured separately from the connecting plate main body and the separating vortices suppressing member may be fitted to an outer periphery of the connecting plate main body so that the arcuate shape of the separating vortices suppressing member constitutes the arcuate portion of the outer peripheral portion of the connecting plate.

According to this construction, the connecting plate comprises the connecting plate main body and the vortices suppressing member having an arcuate shape, separately from each other, and by fitting the vortices suppressing member to the outer periphery of the connecting plate, the arcuate shape of the vortices suppressing member constitutes the arcuate portion of the outer periphery of the connecting plate. Hence, in an existing nuclear reactor, the vortices suppressing member can be easily fitted afterwards to the connecting plate main body and generation and promotion of the separating vortices can be easily suppressed.

In order to achieve the above-mentioned aspects, the present invention also provides a nuclear reactor coolant supply structure as follows;

(2) A nuclear reactor coolant supply structure, wherein the nuclear reactor coolant supply structure comprises a first and second coolant inlet nozzles arranged on one side of a reactor vessel with a main flow generation direction axis of coolant being interposed between the first and second coolant inlet nozzles, a third and fourth coolant inlet nozzles arranged on the other side of the reactor vessel with the main flow generation direction axis of coolant being interposed between the third and fourth coolant inlet nozzles, first coolant supply means supplying the first and fourth coolant inlet nozzles with coolant and second coolant supply means supplying the second and third coolant inlet nozzles with coolant, the first and third coolant inlet nozzles are arranged on the same side relative to the main flow generation direction axis and respective coolant supply flow rates of the first and second coolant supply means are different from each other.

According to the present invention (2), the nuclear reactor coolant supply structure comprises the first coolant supply means supplying the first and fourth coolant inlet nozzles with coolant and the second coolant supply means supplying the second and third coolant inlet nozzles with coolant, the first and third coolant inlet nozzles are arranged on the same side relative to the main flow generation direction axis and the respective coolant supply flow rates of the first and second coolant supply means are different from each other. Hence, the symmetric nature of the main flow in the lower plenum is broken, a random nature and complexity of the flow are mitigated and promotion of the separating flow is prevented and thereby variations in the flow distribution are eliminated and a stable administration of the nuclear reactor can be realized.

The above-mentioned nuclear reactor coolant supply structure may be constructed such that the first coolant supply means is a first and fourth coolant pumps connected corresponding to the first and fourth coolant inlet nozzles, respectively, the second coolant supply means is a second and third coolant pumps connected corresponding to the second and third coolant inlet nozzles, respectively, and a discharge flow rate of the first and fourth coolant pumps is larger than that of the second and third coolant pumps.

According to this construction, the first coolant supply means is the first and fourth coolant pumps connected corresponding to the first and fourth coolant inlet nozzles, respectively, and the second coolant supply means is the second and third coolant pumps connected corresponding to the second and third coolant inlet nozzles, respectively. Thus, only by changing the discharge capacity of existing four pumps, the symmetric nature of the main flow is broken and the random nature and complexity of the flow are mitigated and thereby promotion of the separating flow can be prevented.

The first coolant supply means may be a fifth coolant pump connected to the first and fourth coolant inlet nozzles, the second coolant supply means may be a sixth coolant pump connected to the second and third coolant inlet nozzles and a discharge flow rate of the fifth coolant pump may be larger than that of the sixth coolant pump.

According, to this construction, the first coolant supply means is the fifth coolant pump connected to the first and fourth coolant inlet nozzles and the second coolant supply means is the sixth coolant pump connected to the second and third coolant inlet nozzles. Thus, only by uniting existing four pumps and changing the discharge capacity, the symmetric nature of the main flow is broken and the random nature and complexity of the flow are mitigated and thereby promotion of the separating flow can be prevented.

In order to achieve the above-mentioned aspects the present invention also provides a nuclear reactor internal structure as follows;

(3) A nuclear reactor internal structure of a nuclear reactor comprising a coolant inlet nozzle, a pressure vessel of which bottom portion defines a lower plenum, a reactor core arranged in the pressure vessel, a reactor core tank arranged around the reactor core and a downcomer portion of an annular shape defined between the pressure vessel and the reactor core tank, wherein a flow guide is provided in the lower plenum, the flow guide having an outer peripheral surface formed by a curved surface of which inclination becomes larger toward an upper portion of the flow guide so that, when coolant introduced from the coolant inlet nozzle flows down in the downcomer portion and flows in the lower plenum, the coolant flows up toward the reactor core along the outer peripheral surface of the flow guide.

According to the present invention (3), the flow guide has its outer peripheral surface formed by a curved surface of which inclination becomes larger toward the upper portion thereof and this flow guide is provided in the lower plenum. Thereby, in the lower plenum, the flow is rectified, promotion of turbulent vortices and separating vortices is suppressed and a stable flow in the reactor can be realized.

A connecting plate may be provided in the lower plenum and the flow guide may be a connecting plate flow guide arranged so as to cover an outer peripheral edge of the connecting plate.

According to this construction, the connecting plate flow guide is arranged so as to cover the outer peripheral edge of the connecting plate. Thus, the coolants are prevented from impinging on each other and flow on the upper and lower sides of the connecting plate to proceed to the center of the lower plenum and thereby the flow is rectified and generation and promotion of the turbulent vortices and separating vortices can be suppressed. Also, by so rectifying the flow and suppressing the vortices, pressure loss of the flow of the coolant can be reduced.

Further, a lower reactor core strut, passing through a connecting plate and elongating toward a bottom portion of the lower plenum, may be provided in the bottom portion of the lower plenum and the flow guide may be a lower reactor core strut flow guide arranged so as to cover the surroundings of the lower reactor core strut.

According to this construction, the lower reactor core strut flow guide is arranged so as to cover the surroundings of the lower reactor core strut and thus the coolant is prevented from impinging on the lower reactor core strut. Thereby, the flow is rectified and generation and promotion of the turbulent vortices and the separating vortices can be suppressed.

The outer peripheral surface of the flow guide may be a gradually contracting cylindrical surface or may be constructed by four trapezoidal surfaces. By so forming the outer peripheral surface of the flow guide in the gradually contracting cylindrical surface, the coolant can be led smoothly toward the reactor core from the lower plenum. Also, by so constructing the outer peripheral surface of the flow guide by the four trapezoidal surfaces, these four surfaces are directed so as to follow the direction in which most of the coolant flows and thereby the coolant can be led smoothly toward the reactor core from the lower plenum.

Further, the outer peripheral surface of the flow guide may be provided with a circumferential directional flow suppressing member of a plate shape elongating in the radial direction. By this construction, the outer peripheral surface of the flow guide is provided with the circumferential directional flow suppressing member of a plate shape elongating in the radial direction and thereby the flow is rectified and also, as there is a freedom space of the circumferential directional flow, a possibility that the separating vortices are promoted can be prevented.

In order to achieve the above-mentioned aspects the present invention also provides a nuclear reactor internal structure as follows;

(4) A nuclear reactor internal structure of a nuclear reactor comprising a coolant inlet nozzle, a pressure vessel of which bottom portion defines a lower plenum, a reactor core arranged in the pressure vessel, a reactor core tank arranged around the reactor core, a downcomer portion of an annular shape defined between the pressure vessel and the reactor core tank, a plurality of thermal insulators provided on an outer surface of the reactor core tank so as to protrude into the downcomer portion and a radial connection portion provided in the downcomer portion for connecting the reactor core tank to the pressure vessel, so that coolant is introduced from the coolant inlet nozzle and flows down in the downcomer portion toward the lower plenum, wherein a coolant impinging side of the radial connection portion is formed in a streamlined shape so that generation of a separating flow of the coolant flowing in the downcomer portion and impinging on the radial connection portion is suppressed.

According to the present invention (4), the radial connection portion provided in the downcomer portion for connecting the reactor core tank to the pressure vessel is formed in the streamlined shape. Thereby, generation of the separating flow is suppressed and stabilization and promotion of the separating vortices caused by the separating flow and other vortices caused by random flow joining of the separating flow and the impinging flow can be suppressed.

Also, a plurality of inter-thermal insulator flow paths, through which the coolant is introduced from the coolant inlet nozzle and flows down toward the lower plenum, may be formed in the downcomer portion being surrounded by two adjacent ones of the thermal insulators, and a main flow path arranged below the coolant inlet nozzle out of the inter-thermal insulator flow paths may have a flow path width formed narrower than others of the inter-thermal insulator flow paths.

According to this construction, the plurality of inter-thermal insulator flow paths through which the coolant flows are formed being surrounded by two adjacent ones of the thermal insulators in the downcomer portion and the main flow path arranged below the coolant inlet nozzle out of the inter-thermal insulator flow paths has a flow path width formed narrower than others of the inter-thermal insulator flow paths. Hence, the flow velocity of the main flow is made slower and generation of the separating flow or generation of joining of the separating flow and the separating vortices can be further suppressed. Also, uniformity of the flow rate distribution in the 0°–360° direction is realized and thereby the flow rate of the flow toward the reactor core can be made uniform, which contributes to the operation and output administration of the nuclear reactor.

The thermal insulators may have their corner portions on the side of the coolant inlet nozzle formed in a rounded shape. By this construction, the corner portions of the thermal insulators on the coolant inlet nozzle side is formed in the rounded shape and thereby generation of the separating flow caused by the coolant impinging on the upper portion of the thermal insulators can be suppressed and pressure loss of the flow of the coolant can be reduced.

Also, a separation suppressing member having its one end on the side of the coolant inlet nozzle formed in a streamlined shape may be provided between the thermal insulators. By this construction, the separation suppressing member of which one end on the coolant inlet nozzle side is formed in the streamlined shape is provided between the thermal insulators and thereby separation of the flow of the coolant flowing through the inter-thermal insulator flow path can be suppressed. Also, the flow path width between the thermal insulators can be adjusted.

BRIEF DESCRIPTION OF THE DRAWINGS

FIG. 14 is a view showing a radial connection portion used in the seventh embodiment of FIG. 13 and comprises FIGS. (a) to (c), wherein FIG. 14(a) is a cross sectional plan view, FIG. 14(b) is a cross sectional side view and FIG. 14(c) is a front view;

FIG. 15 is a view for explaining a structure of the radial connection portion of FIG. 14 and comprises FIGS. 15(a) and (b), wherein FIG. 15(a) is a perspective view of a radial support portion and FIG. 15(b) is a perspective view of a radial key portion;

FIG. 16 is a perspective view of the radial connection portion of FIG. 14;

FIG. 17 is a view showing a radial connection portion used in a nuclear reactor internal structure of an eighth embodiment according to the present invention and comprises FIGS. 17(a) and (b), wherein FIG. 17(a) is a perspective view of a radial support portion and FIG. 17(b) is a perspective view of a radial key portion;

FIG. 22 is a cross sectional view taken on line X—X of FIG. 19;

FIG. 23 is a view schematically showing the state of flow on a lower side of a lower connecting plate used in the prior art nuclear reactor internal structure of FIG. 19 and comprises FIGS. 23(a) and (b), both being views of the lower connecting plate seen from below of a lower plenum.

DETAILED DESCRIPTION OF THE PRESENT INVENTION

Herebelow, the invention will be described based on embodiments according to the present invention with reference to appended drawings.

First Embodiment

Figure 1:
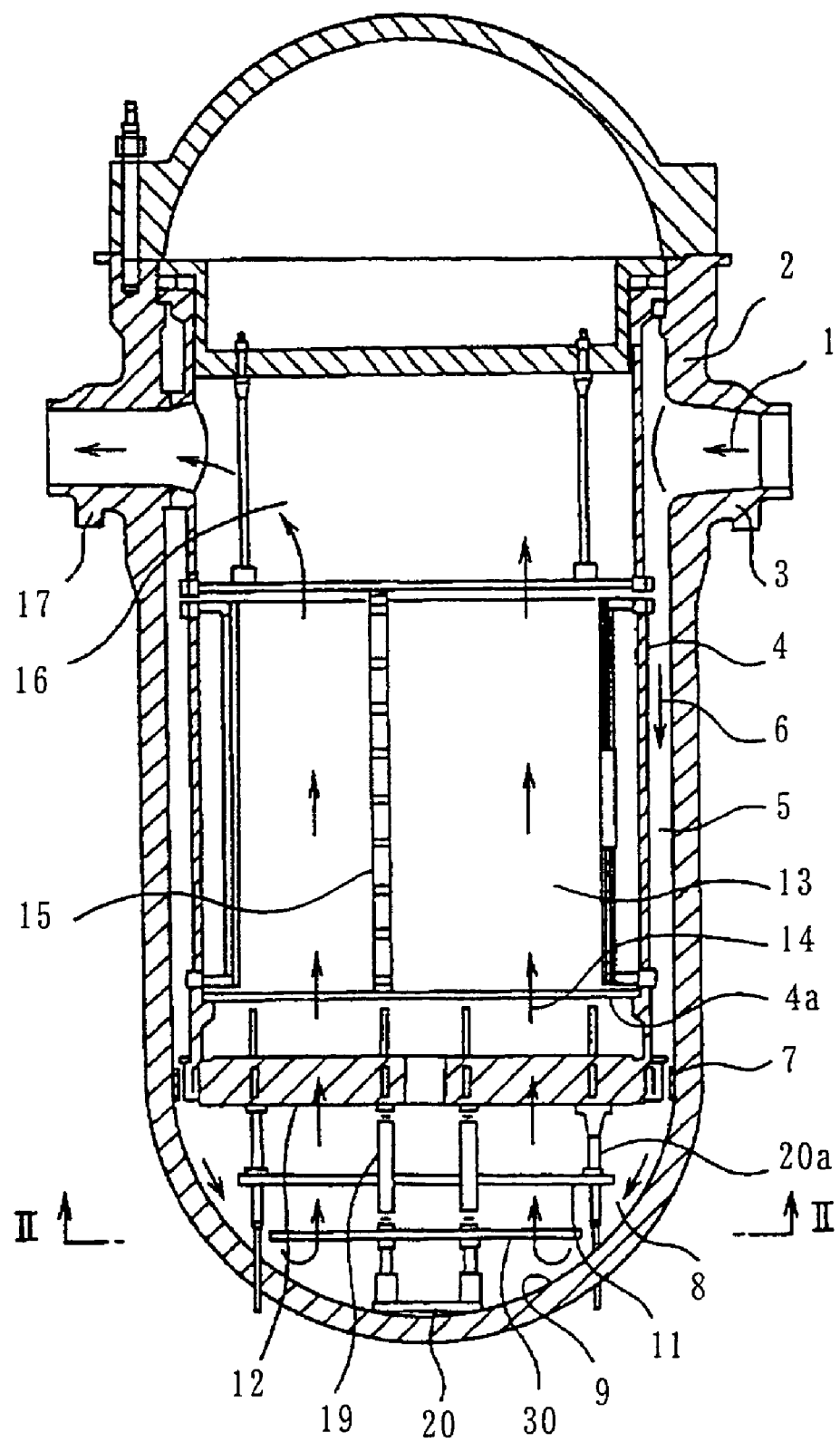
FIG. 1 is a longitudinal cross sectional view of a nuclear reactor internal structure of a first embodiment according to the present invention.
Figure 19:
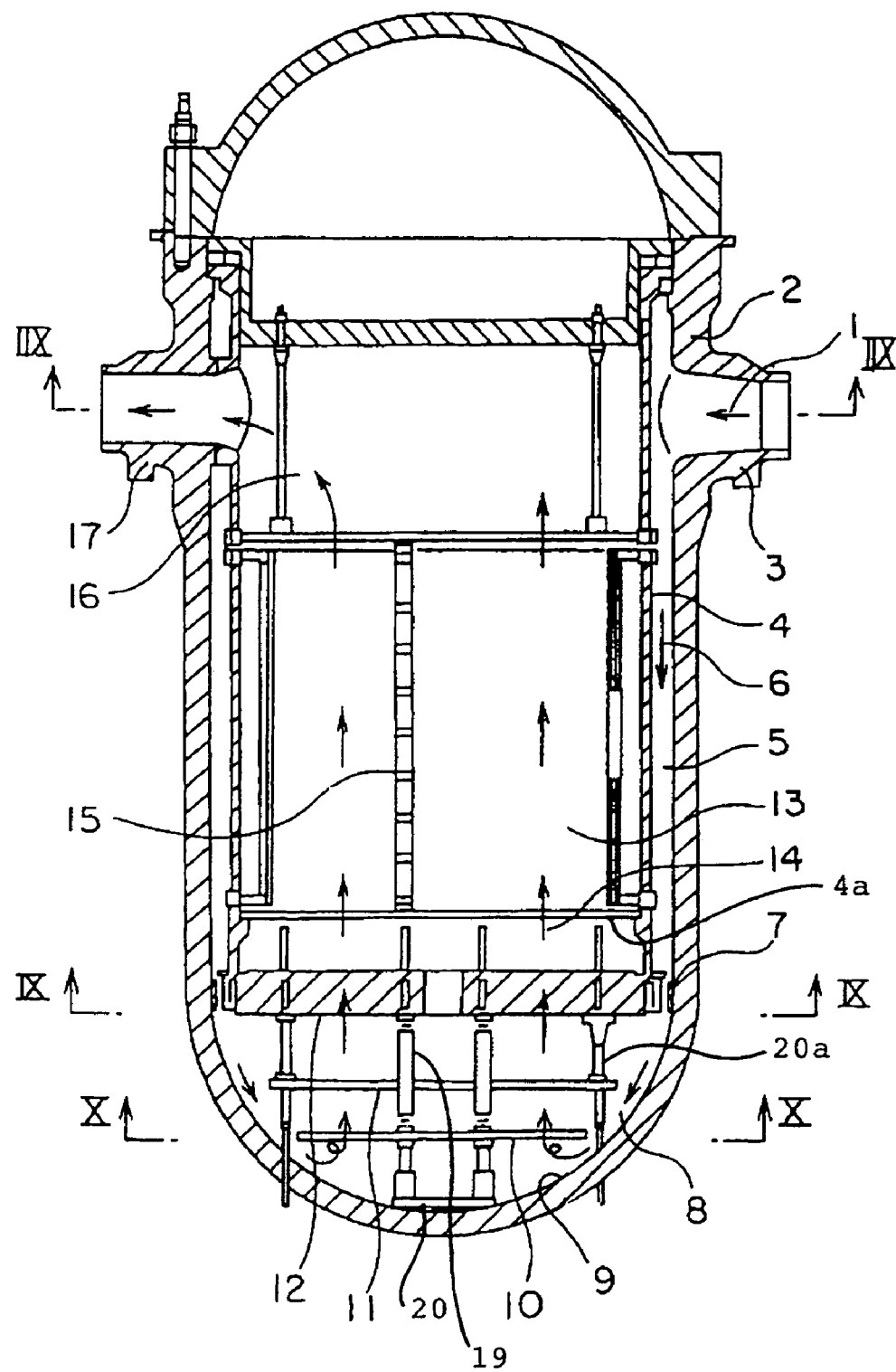
FIG. 19 is a longitudinal cross sectional view of a prior art nuclear reactor internal structure, wherein a portion of the structure is shown with a slight displacement of position.

FIG. 1 is a longitudinal cross sectional view of a nuclear reactor internal structure of a first embodiment. This nuclear reactor relates to a pressurized water reactor and in this nuclear reactor internal structure, as compared with the prior art nuclear reactor internal structure shown in FIG. 19, a lower connecting plate 30 is provided in place of the conventional lower connecting plate 10.

In FIG. 1, the reactor vessel 2 as a pressure vessel has its upper opening closed by a detachable cover and the reactor core tank 4 is supported being suspended from a peripheral portion of the upper opening. The reactor core tank 4 has its bottom portion formed by the lower reactor core plate 4a of a flat plate shape and the reactor core 13 is provided with the fuel assembly 15 in which a multiplicity of fuel rods are arrayed on the lower reactor core plate 4a.

The downcomer portion 5 of an annular shape is provided between the reactor vessel 2 and the reactor core tank 4 so that the coolant 1 flows down in the downcomer portion 5. In the lower portion of the downcomer portion 5 and on the outer side of the lower reactor core supporting plate 12, the radial key portion 7 having a key groove structure is provided by which the reactor core tank 4 is positioned and fixed relative to the reactor vessel 2.

Further, the lower plenum 8 of a semi-spherical shape is formed in the bottom portion of the reactor vessel 2 and in this lower plenum 8, the lower reactor core strut 19 is connected to the lower reactor core supporting plate 12 so as to further connect to the upper connecting plate 11, the lower connecting plate 30 and the falling shock absorbing plate 20, respectively. A plurality the instrument guide pipes 20a are connected to the lower reactor core supporting plate 12 so as to elongate in the perpendicular direction to be collectively connected and supported to the upper connecting plate 11.

Figure 20:
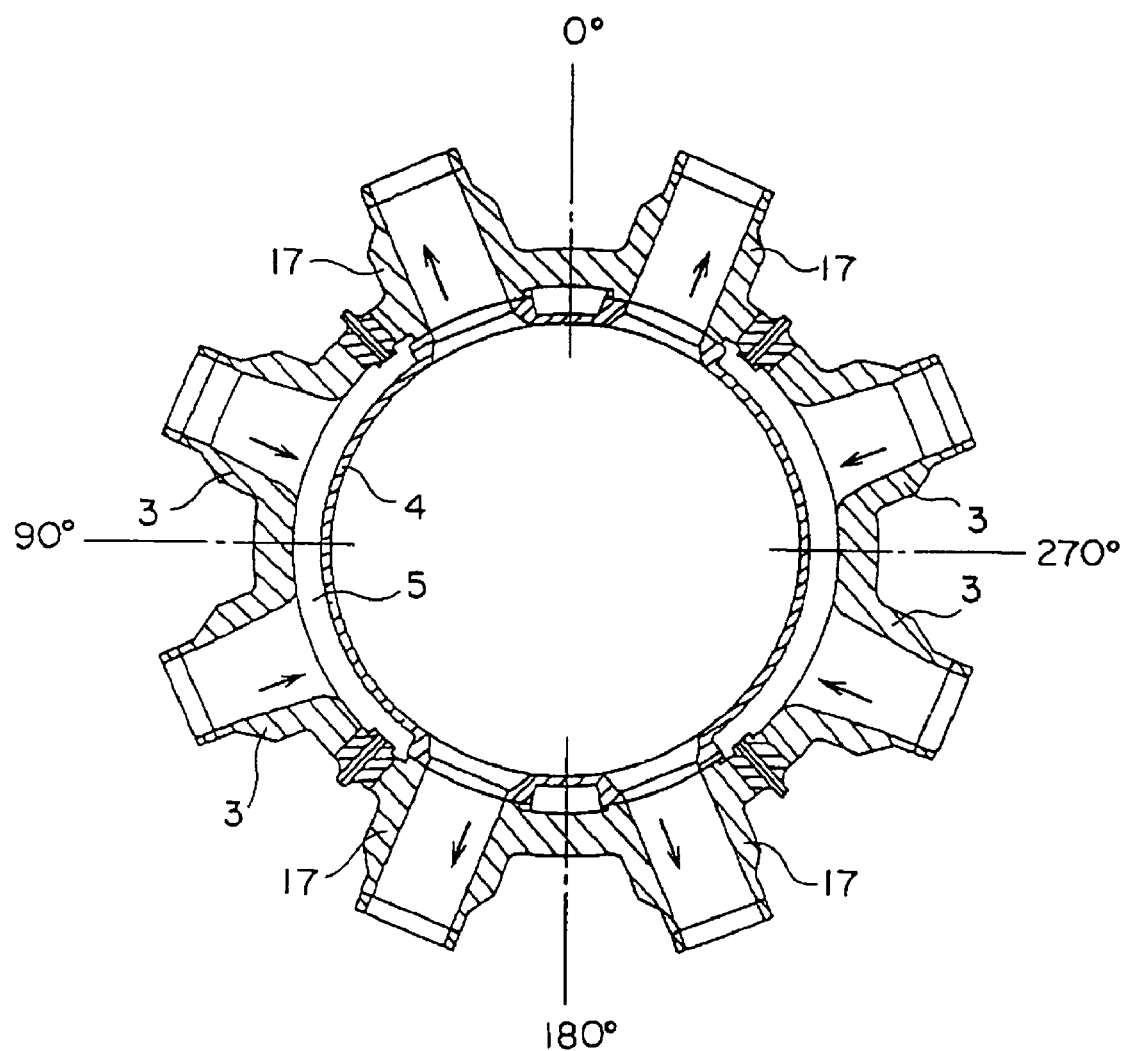
FIG. 20 is a cross sectional view taken on line IIX—IIX of FIG. 19 for explaining a structure of a coolant inlet nozzle and coolant outlet nozzle and surroundings thereof.

Also, as shown in FIG. 20, the respective one pair of the coolant outlet nozzles 17 are arranged at the symmetrical positions around the 0° axis and the 180° axis. Likewise, the respective one pair of the coolant inlet nozzles 3 is arranged at the symmetrical positions around the 90° axis and the 270° axis.

Figure 21:
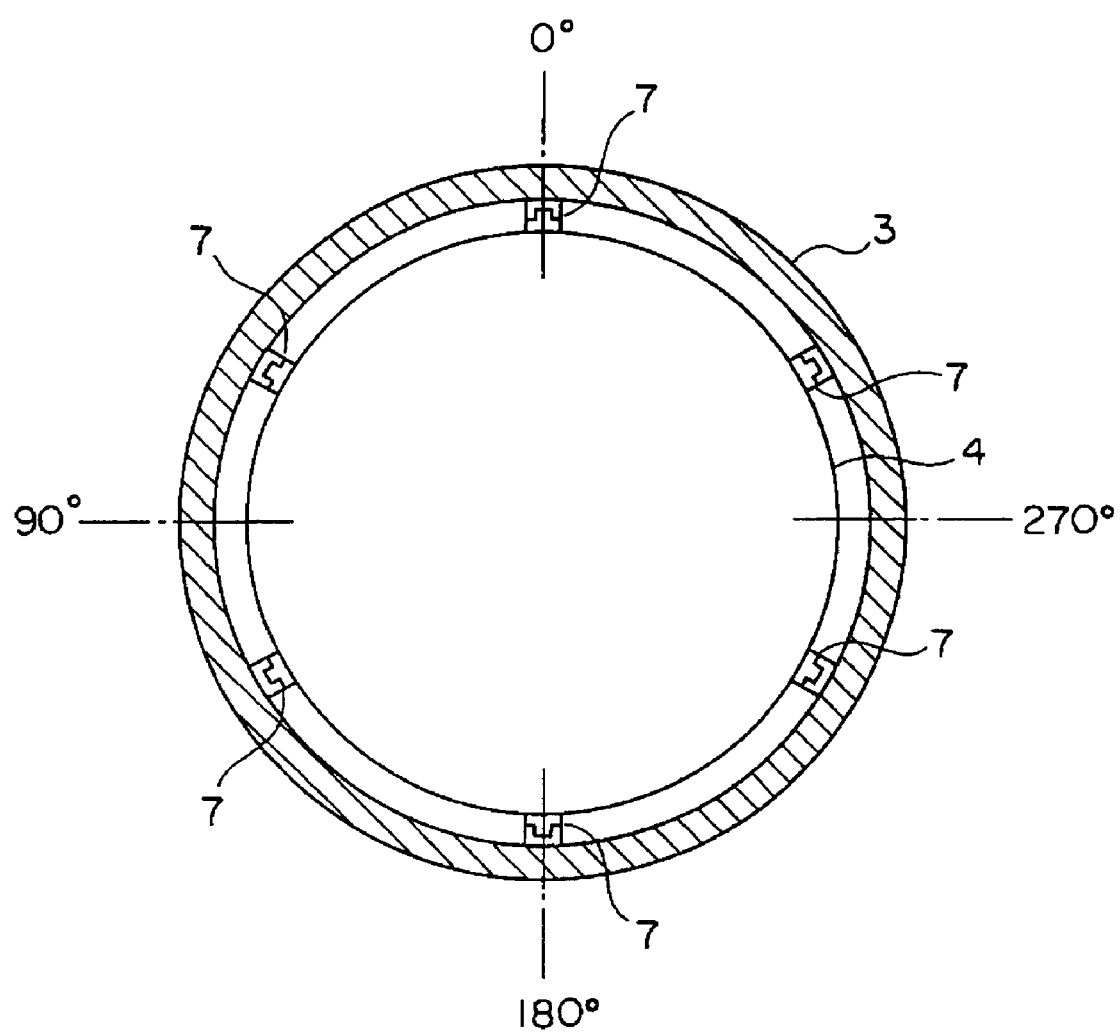
FIG. 21 is a cross sectional view taken on line IX—IX of FIG. 19.
Figure 24:
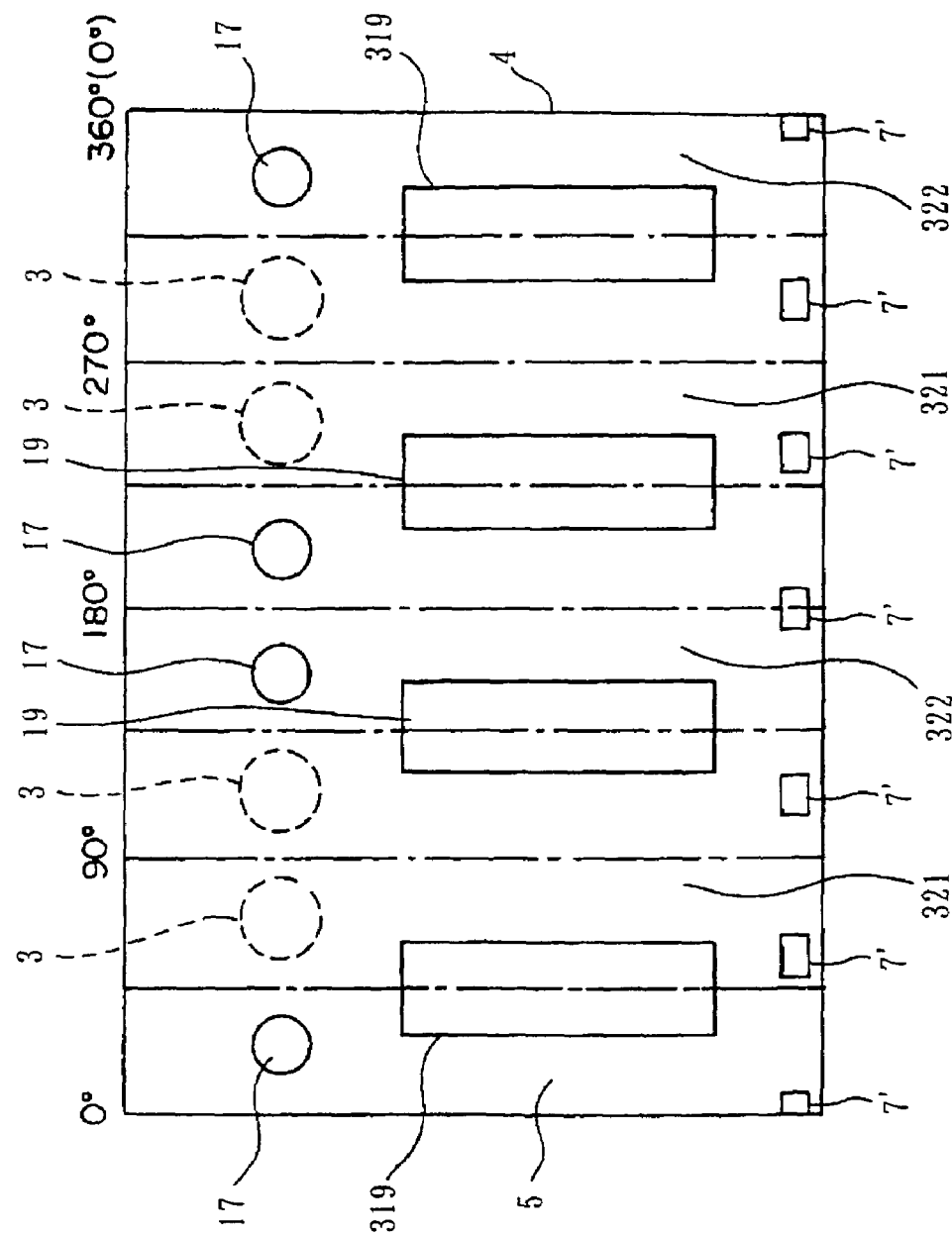
FIG. 24 is a development view of an outer circumferential surface of a reactor core tank of the prior art nuclear reactor internal structure of FIG. 19.

On the other hand, as shown in FIG. 21, the radial key portions 7 of six pieces are arranged in the downcomer portion 5 with 60° intervals starting from the reference of the 0° axis.

Figure 2:
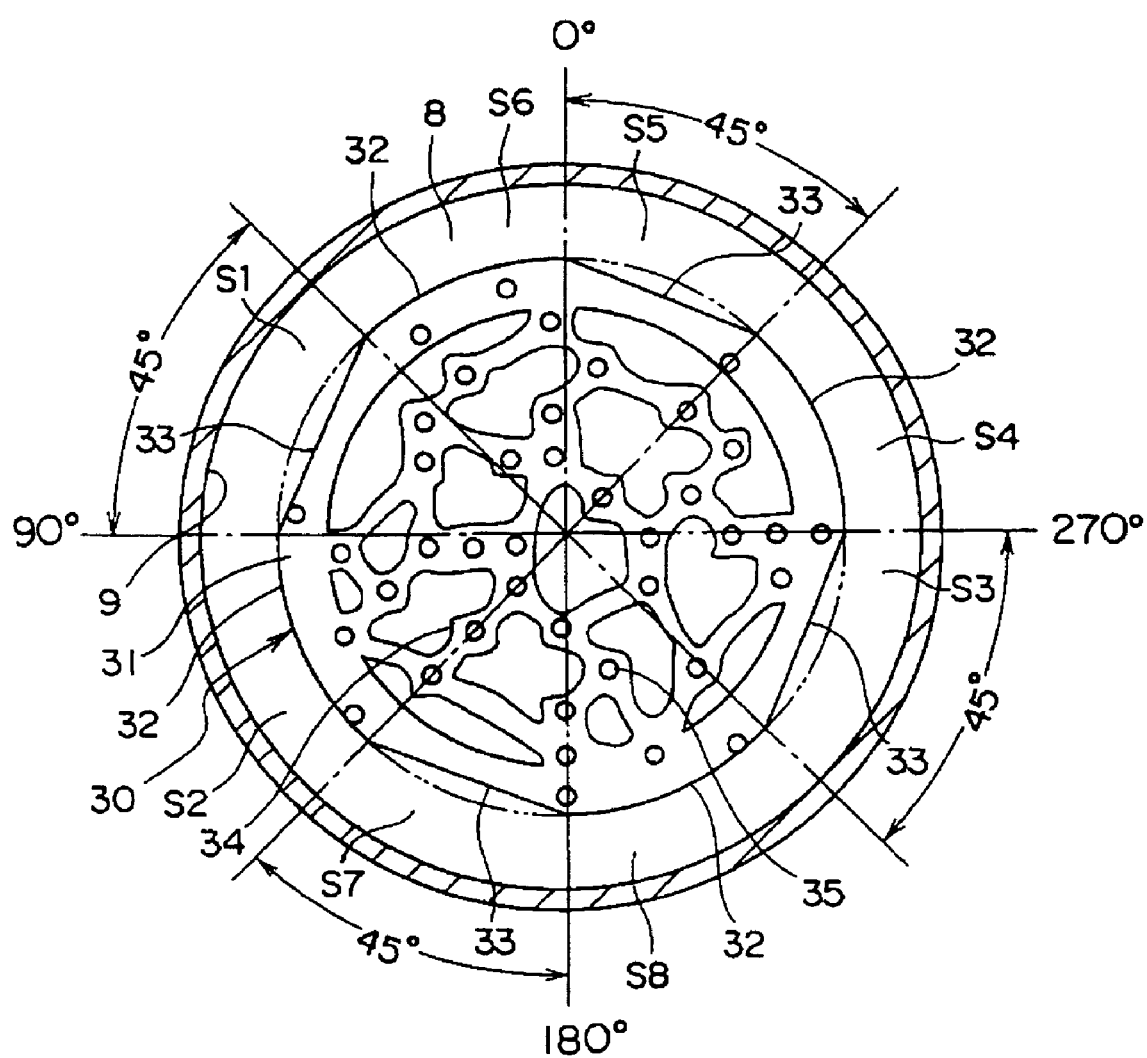
FIG. 2 is a cross sectional view taken on line II—II of FIG. 1.

As shown in FIG. 2 the lower connecting plate 30 arranged in the lower plenum 8 comprises a ring portion 31 of a plate shape. This ring portion 31 has its ring peripheral portion formed such that an arcuate portion 32 and a cut-off portion 33 in which an arcuate peripheral portion is cut off toward the arcuate center side are alternately arranged with 45° intervals starting from the reference of the 0° axis. The ring portion 31 constitutes the outer peripheral portion of the lower connecting plate 30. The cut-off portion 33 has its outer periphery cut off linearly.

An inside portion of the ring portion 31 is formed by a rim portion 34 having a multiplicity of small holes 35 into which the instrument guide pipes 20a are inserted. The rim portion 34 is a plate-like member spreading in a mesh form so as to surround and support these small holes 35 and connects to the ring portion 31.

Thus, the lower connecting plate 30 has its outer peripheral shape formed alternately by the arcuate portions 32 and the cut-off portions 33 and this shape of the outer periphery is asymmetric relative to the 90°–270° axis that is the direction of the main flow and also is asymmetric relative to the 0°–180° axis that constitutes the separating flow generation direction deviating with a phase angle of 90° relative to the main flow direction.

Also, in FIG. 2, flow path areas S1, S3, S5, S7, through which the coolant 1 flows, are formed between the cut-off portions 33 and the inner surface 9 of the lower plenum 8 and flow path areas S2, S4, S6, S8, through which the coolant 1 flows, are likewise formed between the arcuate portions 32 and the inner surface 9 of the lower plenum 8, wherein the respective flow path areas S1, S3, S5, S7 are formed larger than the respective flow path areas S2, S4, S6, S8.

Next, the mode of flow of the coolant in the nuclear reactor of the present embodiment will be described with reference to FIGS. 1 to 4.

Figure 3:
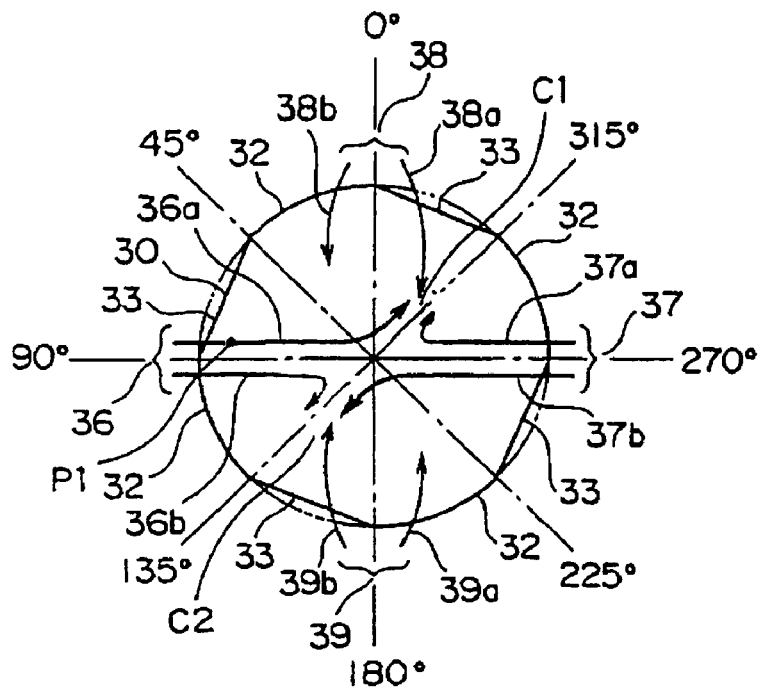
FIG. 3 is a plan view seen from below of a lower plenum, wherein flow on a lower side of a lower connection plate of FIG. 1 is schematically shown.

The coolant 1 flowing into the reactor vessel 2 through the coolant inlet nozzles 3 of one pair existing around the 90° axis and the 270° axis, respectively, joins together so that the flow velocity of the coolant 1 becomes faster and flows down in the downcomer portion 5 between the reactor vessel 2 and the reactor core tank 4. In FIG. 3, main flow 36, 37 flowing down perpendicularly in the downcomer portion 5 passes through between the inner surface 9 of the lower plenum 8 and the ring portion 31 of the lower connecting plate 30 with an approximately same flow velocity and flows toward the central portion of the lower plenum 8 from the direction of the 90° axis and the 270° axis, respectively, below the lower connecting plate 30.

However, the flow path area between the inner surface 9 of the lower plenum 8 and the ring portion 31 of the lower connecting plate 30 in the vicinity of the 90° axis changes at the boundary of the angle of 90°, that is, the flow path area S1 between the 45° axis and the 90° axis is larger than the flow path area S2 between the 90° axis and the 135° axis. Thus, a main flow portion 36a of the main flow 36 that flows on the cut-off portion 33 side is faster in the velocity and more in the flow rate than a main flow portion 36b that flows on the arcuate portion 32 side.

On the other hand, the flow path area between the inner surface 9 of the lower plenum 8 and the ring portion 31 of the lower connecting plate in the vicinity of the 270° axis changes at the boundary of the angle of 270°, that is, the flow path area S3 between the 225° axis and the 270° axis is larger than the flow path area S4 between the 270° axis and the 315° axis. Thus, a main flow portion 37b of the main flow 37 that flows on the cut-off portion 33 side is faster in the velocity and more in the flow rate than a main flow portion 37a that flows on the arcuate portion 32 side.

Here, when the main flow portion 36a and the main flow portion 37a impinge on each other, as the main flow portion 36a is faster than the main flow portion 37a, the impinging flow is directed to flow to the direction deviating from the 270° axis. Also, the impinging flow of the main flow portion 36b and the main flow portion 37b is directed to flow to the direction deviating from the 90° axis.

Also, a portion of the dispersing flow in which the coolant 1 disperses in the circumferential direction in the downcomer portion 5, while it flows down, impinges on the radial key portion 7 so that the separating flow 38, 39, separated on both sides of the radial key portion 7, is formed. The separating flow 38, 39 passes through between the inner surface 9 of the lower plenum 8 and the ring portion 31 of the lower connecting plate 30 to enter the 0° axis portion and the 180° axis portion, respectively, below the lower connecting plate 30 and flows in to the direction deviating from the central portion of the lower plenum 8.

The flow path area between the inner surface of the lower plenum 8 and the outer peripheral portion of the lower connecting plate 30 in the vicinity of the 0° axis changes at the boundary of the angle of 0°, that is, the flow path area S5 between the 315° axis and the 360° (0°) axis is larger than the flow path area S6 between the 0° axis and the 45° axis. Thus, a separating flow portion 38a of the separating flow 38 that flows on the cut-off portion 33 side is faster in the velocity and more in the flow rate than a separating flow portion 38b that flows on the arcuate portion 32 side. Likewise, as the flow path area S7 between the 135° axis and the 180° axis is larger than the flow path area S8 between the 180° axis and the 225° axis, a separating flow portion 39b of the separating flow 39 that flows on the cut-off portion 33 side is faster in the velocity and more in the flow rate than a separating flow portion 39a that flows on the arcuate portion 32 side.

Hence, as the result of the construction of the lower connecting plate 30, the impinging positions C1, C2 of the main flow and the separating flow are caused to deviate and also the main flow and the separating flow impinge head to head on each other. That is, by breaking the symmetric nature of the main flow, the main flow, being prevented from flowing in between the separating flows, is caused to flow toward the separating flow portions to impinge thereon and thereby promotion of the separating flow can be prevented. Moreover, by breaking the symmetric nature of the separating flow also, the regular and symmetric generation of the separating flow is prevented and promotion of the separating flow can be further suppressed.

Figure 4:
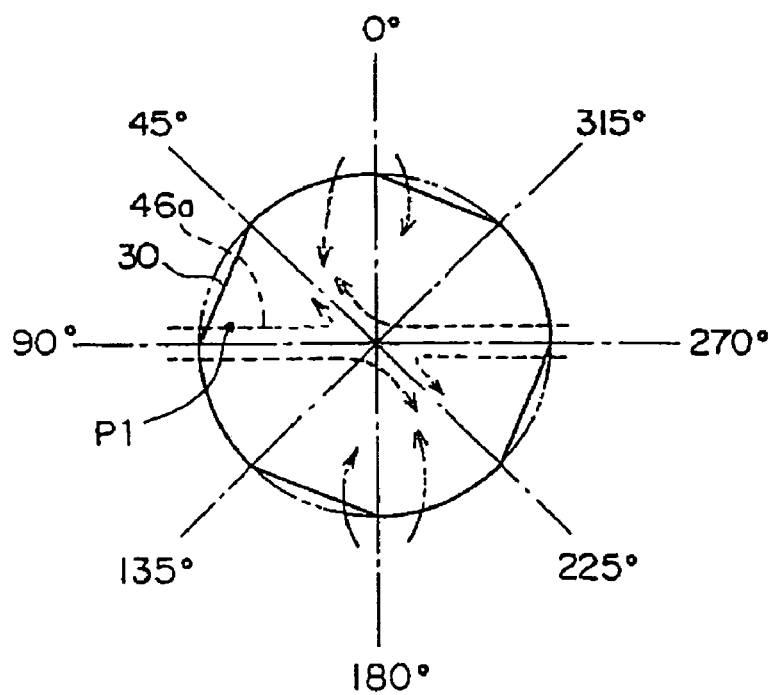
FIG. 4 is a plan view seen from below of the lower plenum, wherein flow on an upper side of the lower connecting plate of FIG. 1 is schematically shown.

Also, in FIG. 4 showing the lower connecting plate 30 seen from above, in contrary with FIG. 3 showing the lower connecting plate 30 seen from below, it is seen that, in the portion above the lower connecting plate 30 corresponding to the portion below the lower connecting plate 30 where the flow velocity of the coolant 1 is relatively fast, the flow velocity becomes slow reversely. This is for the reason that, in the portion below the lower connecting plate 30 where the flow velocity of the coolant 1 is relatively fast, that is, in portion P1 in FIG. 3 for example, more coolant 1 flows below the lower connecting plate 30 and thus the flow rate of the coolant 1 above the lower connecting plate 30 becomes less, so that flow velocity of a main flow portion 46a (FIG. 4) becomes slower than that of the main flow portion 36a. That is, the distribution of the relative flow velocity of the main flow and the separating flow is in reverse relation between the upper side and the lower side of the lower connecting plate 30.

Hence, on the upper side also of the lower connecting plate 30, by breaking the symmetric nature of the main flow and the separating flow, respectively, generation and promotion of the separating flow can be suppressed.

Second Embodiment

Figure 5:
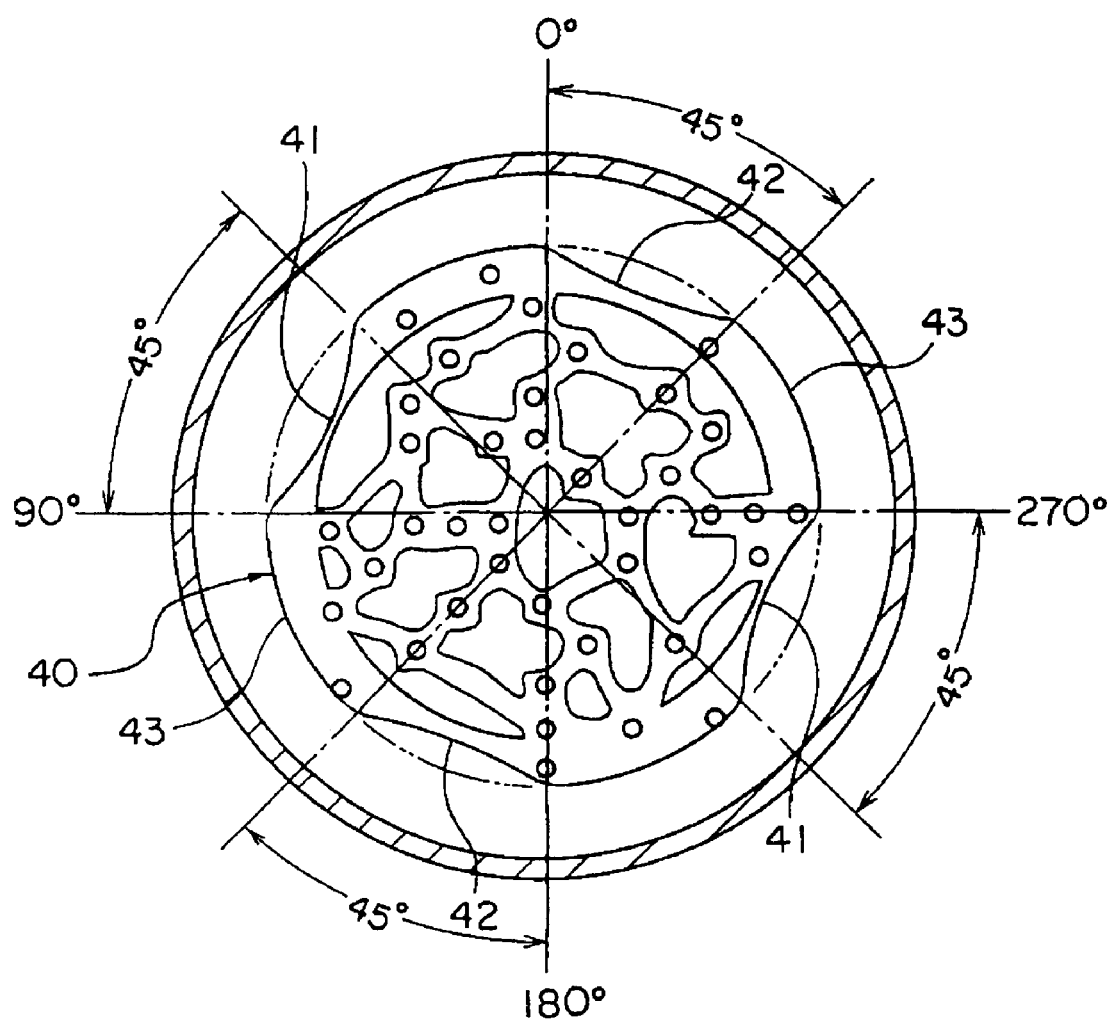
FIG. 5 is a cross sectional plan view seen from below of a lower connecting plate and surroundings thereof used in a nuclear reactor internal structure of a second embodiment according to the present invention.

A second embodiment of a nuclear reactor internal structure according to the present invention has a lower connecting plate 40 provided therein in place of the lower connecting plate 30 employed in the first embodiment. As shown in FIG. 5, the lower connecting plate 40 is different from the lower connecting plate 30 shown in FIG. 2 only in the shape of the outer peripheral cut-off portion.

The cut-off portion 41 through which the main flow passes on the 90° axis side or the 270° axis side, as compared with the cut-off portion 42 through which the separating flow passes on the 0° axis side or the 180° axis side, is formed with an arcuate curve of the cut having a smaller radius as well as with a larger depth of the cut toward the center side of the lower connecting plate 40.

Also, both of the cut-off portions 41 and 42, as compared with the cut-off portion 33 that is linearly cut of the lower connecting plate 30 of FIG. 2, are formed with a larger depth of the cut toward the center side of the lower connecting plate 40 as well as have their both side end corners rounded.

By so deeply cutting the cut-off portion through which the main flow passes, imbalances between the main flow passing through the cut-off portion 41 and the main flow passing through the arcuate portion 43 can be further enlarged and generation and promotion of the object-downstream separating vortices can be suppressed.

Also, by making the cut in the arcuate curve and also making both side end corners of the cut in the smooth rounded form, distribution of the flow can be made continuous as compared with the cut linearly formed and a stable main flow and separating flow in which the symmetrical nature is broken can be realized.

Third Embodiment

Figure 6:
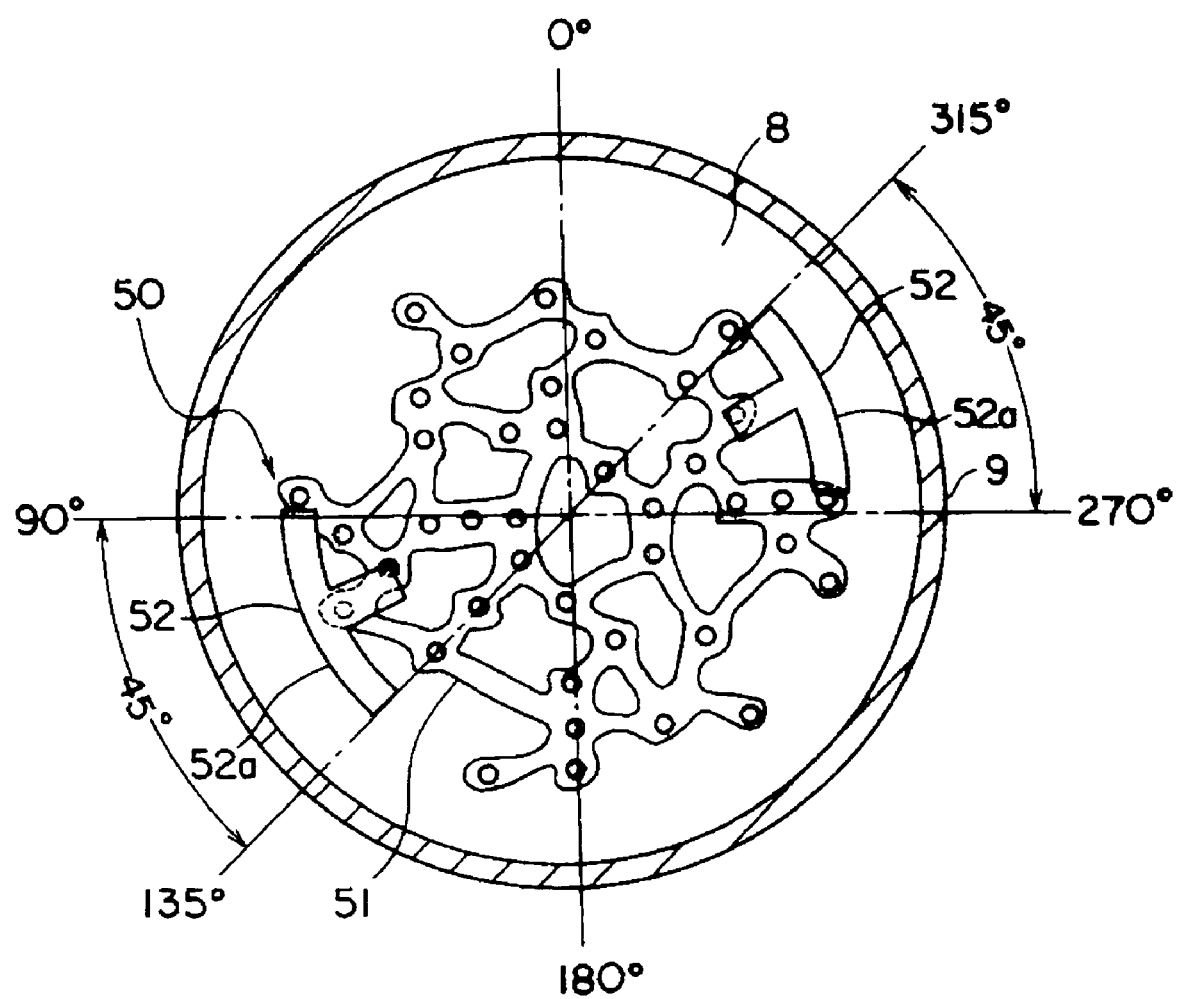
FIG. 6 is a cross sectional plan view seen from below of a lower connecting plate and surroundings thereof used in a nuclear reactor internal structure of a third embodiment according to the present invention.

A third embodiment of a nuclear reactor internal structure according to the present invention has a lower connecting plate 50 provided therein in place of the lower connecting plate 30 employed in the first embodiment. As shown in FIG. 6, the lower connecting plate 50 is different from the lower connecting plate 30 shown in FIG. 2 such that in the portion between the angles of 90° and 135° as well as of 270° and 315° of an outer periphery of a lower connecting plate main body 51 having none of the ring portion 31, a separating vortices suppressing member 52 as a plate-like member of an approximately T-shape having an arcuate outer periphery 52a is fixed to the lower connecting plate main body 51 by welding, bolting or the like. Or, alternatively, the lower connecting plate 50 having its outer periphery formed with such a vortices suppressing member 52 may be made as an integral unit.

Thus, by so providing the vortices suppressing member 52 having the arcuate outer periphery 52a in the range of angles of 90° to 135° as well as of 270° to 315° also, like in the first embodiment, imbalances of the main flow can be generated.

Also, by employing such a construction as to separately manufacture the vortices suppressing member 52 and fit it to the lower connecting plate main body 51, if, for example, an existing nuclear reactor has such a lower connecting plate as having no ring portion like the lower connecting plate main body 51, such a member as the separating vortices suppressing member 52 can be easily fitted afterwards and thereby generation and promotion of the separating vortices can be easily suppressed even in the existing nuclear reactor.

It is to be noted that, if the above-mentioned separating vortices suppressing member 52 is provided in the range of angles of 180° to 225° as well as of 0° to 45° of the lower connecting plate main body 51, imbalances of the separating flow can be likewise generated and thereby also generation and promotion of the separating vortices can be suppressed.

Fourth Embodiment

Figure 7:
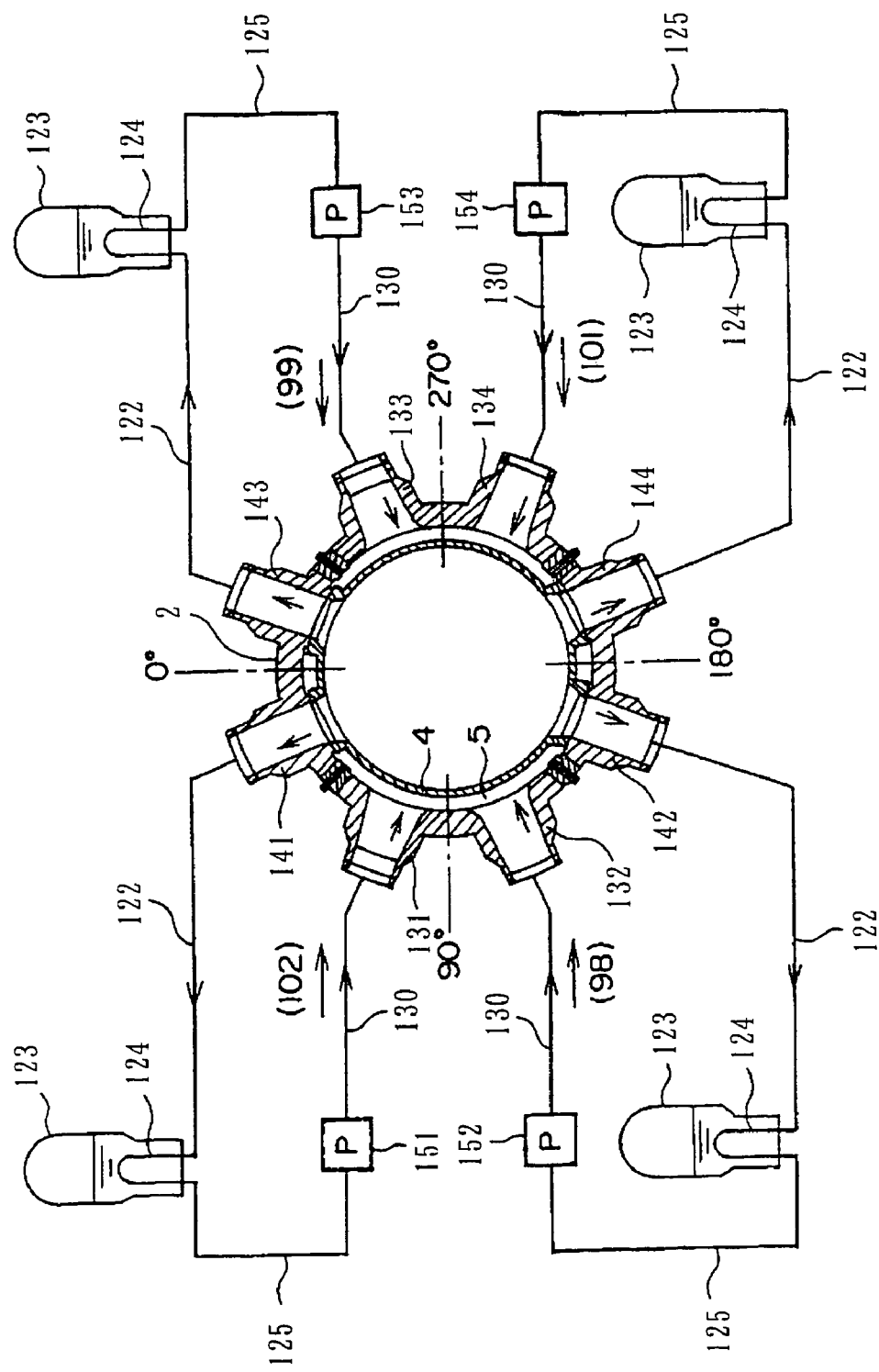
FIG. 7 is a view schematically showing a nuclear reactor coolant circulation structure of a fourth embodiment according to the present invention.

FIG. 7 is a schematic view showing a primary coolant circulation structure of a nuclear reactor of a fourth embodiment according to the present invention, wherein first to fourth coolant pumps 151 to 154 having different discharge rates between each other are employed differently from the prior art coolant pumps having the same discharge rate between each other. The nuclear reactor internal structure of the present fourth embodiment is the same as the prior art structure described with respect to FIG. 19.

As shown in FIG. 7, a first coolant inlet nozzle 131 and a second coolant inlet nozzle 132 are arranged in the symmetric positions relative to the 90° axis on one side of the reactor vessel 2. Likewise, a third coolant inlet nozzle 133 and a fourth coolant inlet nozzle 134 are arranged in the symmetric positions relative to the 270° axis on the other side of the reactor vessel 2. Here, the 90° axis and the 270° axis or the 90°–270° axis constitutes a main flow generation axis along which the main flows flow in the lower plenum 8 toward the center thereof.

The first coolant inlet nozzle 131 and the third coolant inlet nozzle 133 as well as the second coolant inlet nozzle 132 and the fourth coolant inlet nozzle 134, respectively, are arranged in the symmetric positions relative to the 0°–180° axis.

Also, a first coolant outlet nozzle 141 and a third coolant outlet nozzle 143 are arranged in the symmetric positions relative to the 0° axis on the angle 0° side of the reactor vessel 2. Likewise, a second coolant outlet nozzle 142 and a fourth coolant outlet nozzle 144 are arranged in the symmetric positions relative to the 180° axis on the angle 180° side of the reactor vessel 2. Here, the 0° axis and the 180° axis or the 0°–180° axis constitutes a separating flow generation axis along which the separating flow is generated by the radial key portion 7.

Between the first to fourth coolant inlet nozzles 131 to 134 and the first to fourth coolant outlet nozzles 141 to 144, four loops of the primary cooling system are formed, whereby in each of the loops, the coolant 1 flows out from the reactor vessel 2 and returns to the reactor vessel 2.

Also, in each of the loops, a steam generator 123 having a heat exchanger tube 124 is provided. For example, with respect to the first coolant outlet nozzle 141, the steam generator 123 is connected thereto via a high temperature side piping 122.

On the outlet side of the steam generator 123, an outlet side piping 125 is connected to the heat exchanger tube 124. A first coolant pump 151 has its inlet connected to the outlet side piping 125 and its outlet connected to the first coolant inlet nozzle 131 via a low temperature side piping 130.

Each of the loops is constructed such that only the discharge rate performance of the coolant pumps 151 to 154 is different between each of them. That is, the discharge rate performance of the coolant pumps 151 to 154 gradually decreases in the order of the first coolant pump 151, the fourth coolant pump 154, the third coolant pump 153 and the second coolant pump 152. For example, supposing that the discharge rate of the first coolant pump 151 is a magnitude of 102, that of the fourth coolant pump 154 is 101, that of the third coolant pump 153 is 99 and that of the second coolant pump 152 is 98.

Here, the first coolant pump 151 and the fourth coolant pump 154 constitute a first coolant supply means and the second coolant pump 152 and the third coolant pump 153 constitute a second coolant supply means.

Next, how the coolant flows in the interior of the nuclear reactor having the coolant circulation structure of the present fourth embodiment will be described with reference to FIGS. 7 and 8.

The coolant 1 that has been discharged from the first coolant pump 151 flows via the first coolant inlet nozzle 131 and enters the downcomer portion 5 to flow down therein. Then, in the lower plenum 8, as shown in FIG. 8, the coolant 1 flows toward the center of the lower plenum 8 from the 90° axis side and forms a fastest main flow 136a.

The coolant 1 that has been discharged from the second coolant pump 152 flows via the second coolant inlet nozzle 132 and enters the downcomer portion 5 to flow down therein. Then, in the lower plenum 8, the coolant 1 flows toward the center of the lower plenum 8 from the 90° axis side and forms a slowest main flow 136b.

The coolant 1 that has been discharged from the third coolant pump 153 flows via the third coolant inlet nozzle 133 and enters the downcomer portion 5 to flow down therein. Then, in the lower plenum 8, the coolant 1 flows toward the center of the lower plenum 8 from the 180° axis side and forms a second slowest main flow 137a.

The coolant 1 that has been discharged from the fourth coolant pump 154 flows via the fourth coolant inlet nozzle 134 and enters the downcomer portion 5 to flow down therein. Then, in the lower plenum 8, the coolant 1 flows toward the center of the lower plenum 8 from the 180° axis side and forms a second fastest main flow 137b.

Here, at the position C1 where the main flow 136a and the main flow 137a impinge on each other, the main flow 136a is faster than the main flow 137a and hence the position C1 deviates toward the 270° axis side from the center of the lower plenum 8. Also, at the position C2 where the main flow 136b and the main flow 137b impinge on each other, the main flow 137b is faster than the main flow 136b and hence the position C2 deviates toward the 90° axis side from the center of the lower plenum 8.

Further, a portion of the dispersing flow in which the flow of the coolant 1 disperses in the circumferential direction in the downcomer portion 5, while it goes down, impinges on the radial key portion 7. Thereby, separating flow 138, 139 is formed on both sides of the radial key portion 7 and enters the lower plenum 8 from the 0° axis side and the 180° axis side, respectively. Then, the separating flow 138, 139 flows toward the direction deviating from the center of the lower plenum 8.

In this way, by making the flow rate and kinetic energy of the main flow unbalanced, the impinging positions C1, C2 are caused to so deviate, the symmetric nature of the main flow is broken and the flow of the coolant 1, after impingement, is given with the directivity. Thus, composition of the main flow and the separating flow is prevented, random nature and complexity of the flow are mitigated and separation of the separating flow is lessened and thereby promotion of the separating flow can be prevented. Also, the coolant 1 flows into the reactor core 13 with a uniform flow rate, variations of the power output of the reactor core 13 can be avoided and increase of the pressure loss of the flow of the coolant 1 can be avoided.

It is to be noted that, insofar as the above-mentioned magnitude relationship of the discharge rate is maintained by and among the first to fourth coolant pumps, the first to fourth coolant pumps may be separately manufactured with different performances between each other. Also, in order to make use of manufacturing irregularity of coolant pumps of the same specification, the discharge rate performance of each of the coolant pumps is measured and the first to fourth coolant pumps 151 to 154 are selected so as to maintain the above-mentioned magnitude relationship and may be incorporated in the respective loops of the cooling system. Also, by making use of differences in the manufacturing tolerance of the first to fourth coolant pumps 151 to 154, such a flow rate balance as effective for suppressing the vortices may be realized.

Further, it is to be noted that by making the discharge flow rate of any one of the first to fourth coolant pumps larger or smaller, the symmetric nature of the main flow may also be broken.

Fifth Embodiment

Figure 9:
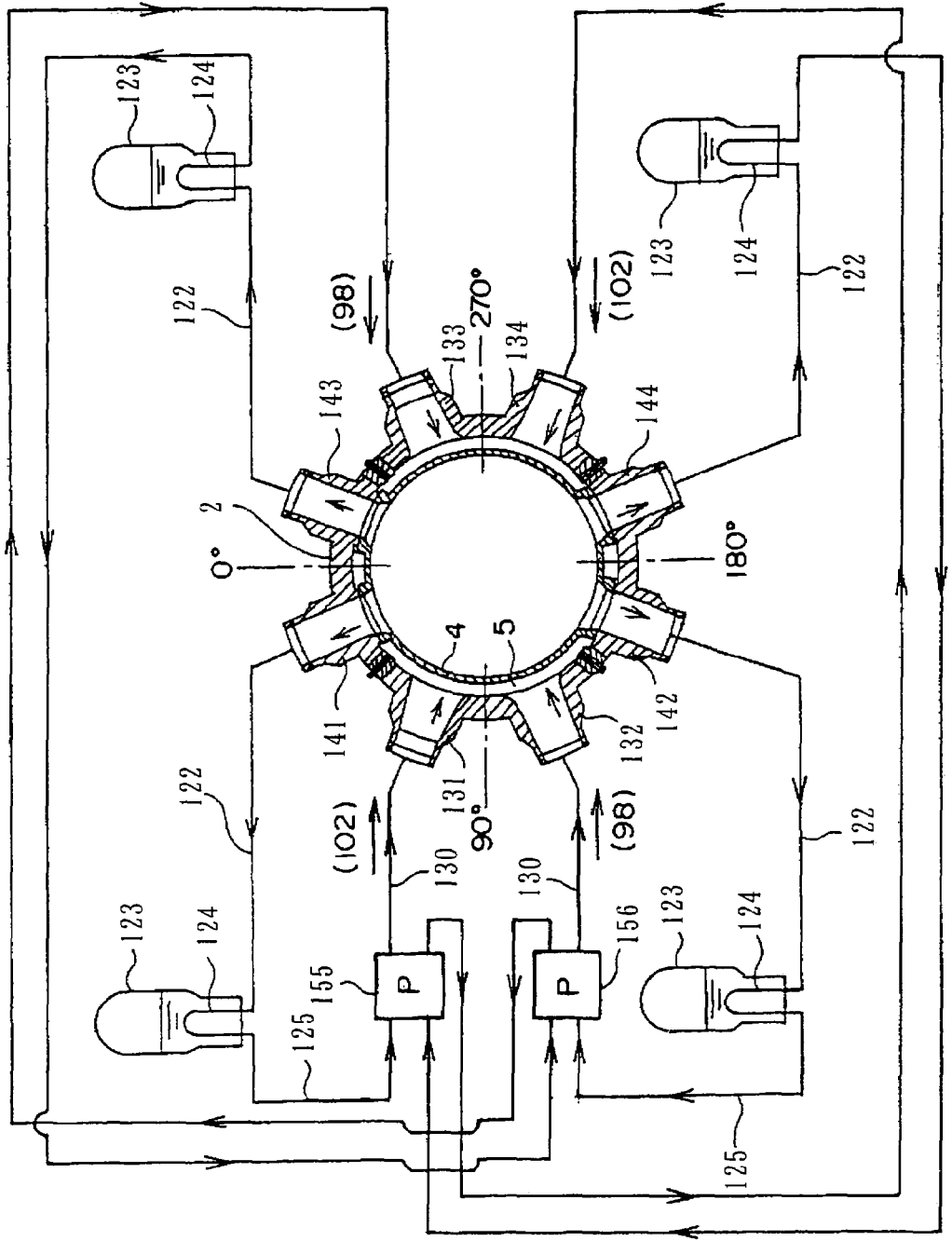
FIG. 9 is a view schematically showing a nuclear reactor coolant circulation structure of a fifth embodiment according to the present invention.

FIG. 9 is a schematic view showing a primary coolant circulation structure of a nuclear reactor of a fifth embodiment according to the present invention, wherein, differently from the primary coolant circulation structure of the fourth embodiment, two (fifth and sixth) coolant pumps 155, 156 are provided in place of the four coolant pumps 151 to 154.

An outlet of the fifth coolant pump 155 is connected to the first coolant inlet nozzle 131 and the fourth coolant inlet nozzle 134. Also, an outlet of the sixth coolant pump 156 is connected to the second coolant inlet nozzle 132 and the third coolant inlet nozzle 133.

As for the discharge flow rate performance, the fifth coolant pump 155 is larger than the sixth coolant pump 156. For example, supposing that the discharge flow rate of the fifth coolant pump 155 is a magnitude of 102, that of the sixth coolant pump 156 is 98.

Figure 8:
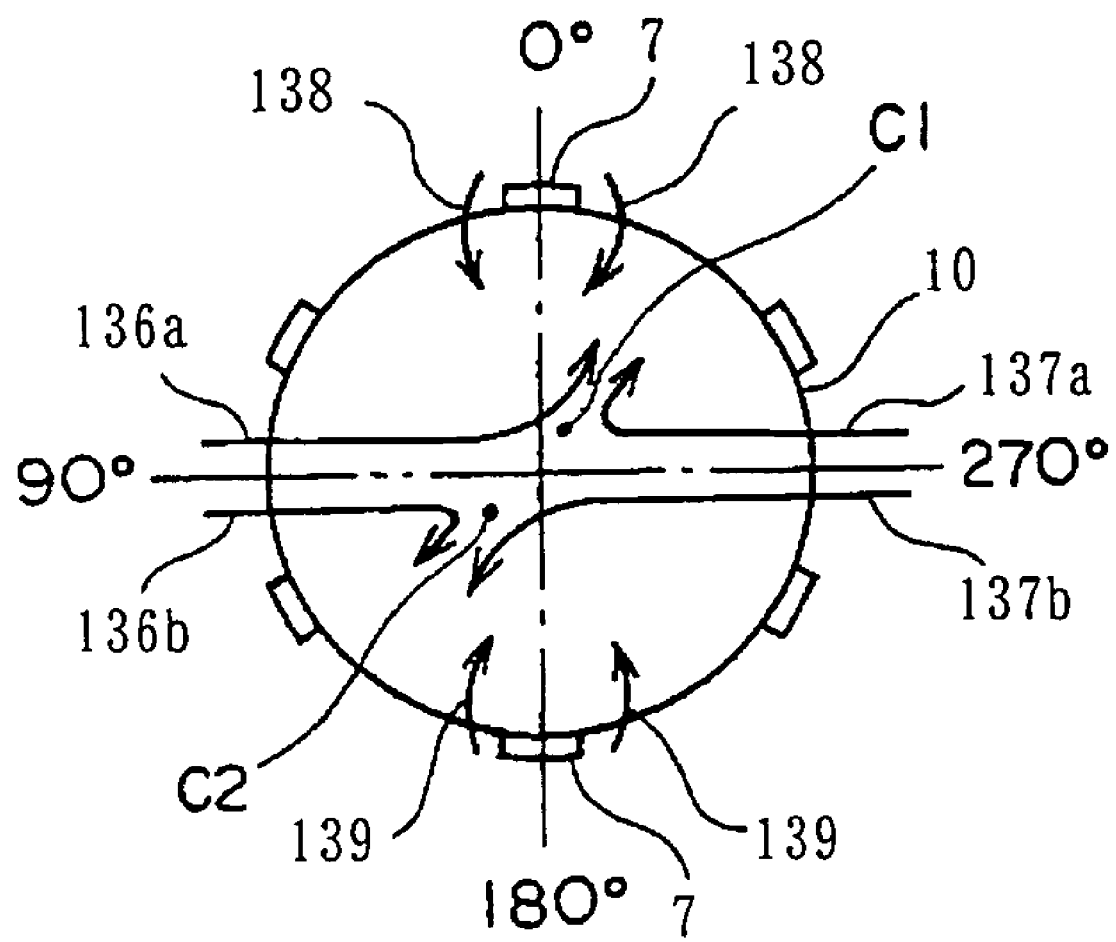
FIG. 8 is a plan view seen from below of a lower plenum, wherein flow on a lower side of a lower connecting plate of the nuclear reactor coolant circulation structure of the fourth embodiment is schematically shown.

By using the construction of the fifth embodiment also, as shown in FIG. 8, the impinging positions C1, C2 of the main flows are caused to deviate and the symmetric nature of the main flow is broken. Thereby, the random nature and complexity of the flow are mitigated and promotion of the separating vortices can be prevented.

Sixth Embodiment

Figure 10:
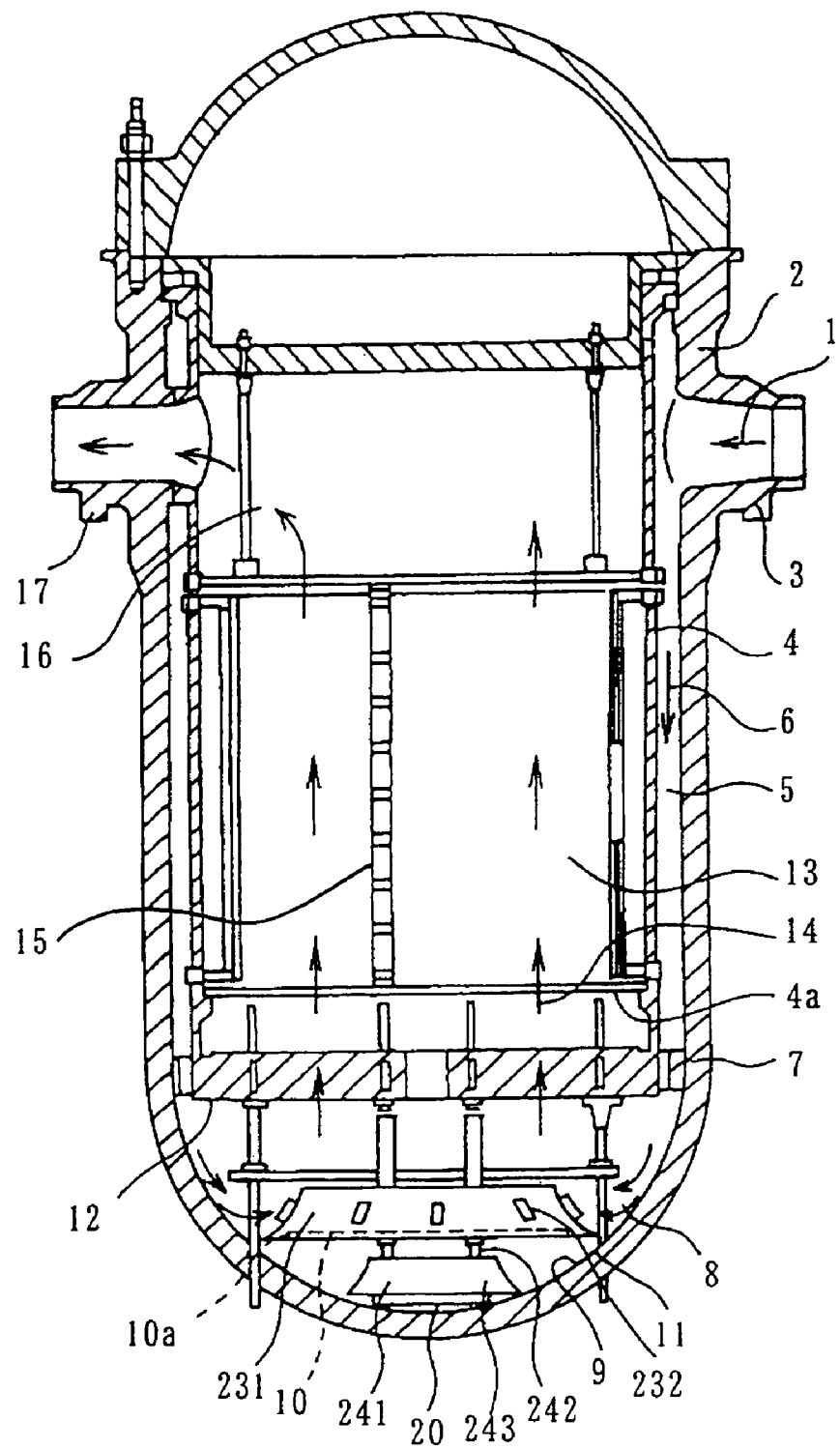
FIG. 10 is a longitudinal cross sectional view of a nuclear reactor internal structure of a sixth embodiment according to the present invention.

FIG. 10 is a longitudinal cross sectional view of a nuclear reactor internal structure of a sixth embodiment according to the present invention, wherein the basic structure of the reactor is the same as that shown in FIG. 1 and repeated description thereon will be omitted.

Figure 11:
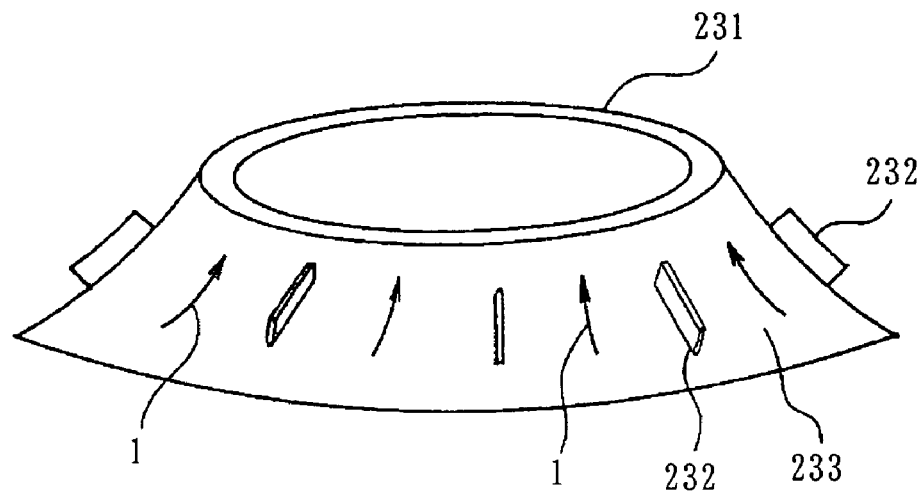
FIG. 11 is a perspective view of a connecting plate flow guide used in the sixth embodiment of FIG. 10.

In FIG. 10, surrounding the lower connecting plate 10, a connecting plate flow guide 231, as will be described with respect to FIG. 11, is provided so as to cover an outer circumferential periphery 10a of the lower connecting plate 10. Also, in a bottom portion of the lower plenum 8, a lower reactor core strut flow guide 241, as will be described with respect to FIG. 12, is provided so as to cover the surroundings of the lower reactor core strut 242.

As shown in FIG. 11, the connecting plate flow guide 231 is formed in a gradually contracting cylindrical shape having its outer circumferential surface 233 formed in a curved surface in which inclination of the curve becomes larger toward the upper portion thereof. The outer circumferential surface 233 has its central portion formed so as to be recessed toward the inner side thereof.

A circumferential directional flow suppressing member 232 of a rectangular plate shape is provided on the outer circumferential surface 233 so as to elongate in the radial direction with an appropriate number of pieces, for example, 8 pieces arranged in the circumferential direction. While the illustration shows the circumferential directional flow suppressing members 232 arranged with equal intervals between them in the circumferential direction, they may be arranged not with the equal intervals but so as to be densely arranged with narrower intervals in the vicinity of the main flow of the coolant 1. Also, the number of pieces of the circumferential directional flow suppressing members 232 is not limited to eight.

Figure 12:
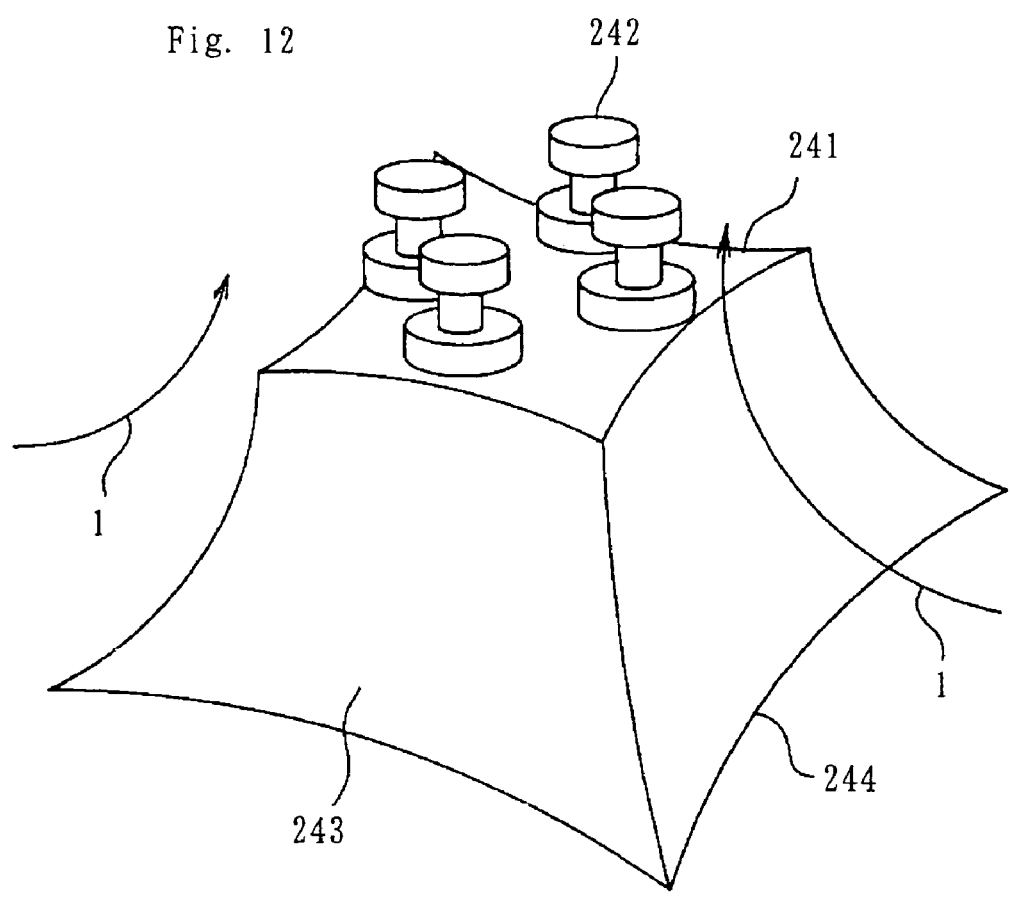
FIG. 12 is a perspective view of a lower reactor core strut flow guide used in the six embodiment of FIG. 10.

As shown in FIG. 12, the lower reactor core strut flow guide 241 is formed in a shape having an outer peripheral surface 243 formed by four trapezoidal shape surfaces of which central portions are formed so as to be recessed toward the inner sides thereof. The lower reactor core strut flow guide 241 has its interior formed so that a lower reactor core strut 242 passes therethrough and its bottom portion 244 connected to the shock absorbing plate 20.

Next, the flow of the coolant 1 in the nuclear reactor internal structure of the present sixth embodiment will be described with reference to FIG. 10.

The coolant 1 flows in from the coolant inlet nozzles 3 on both sides of the reactor vessel 2 and flows down as the downflow 6 in the downcomer portion 5. Then, the coolant 1 passes through the radial key portion 7 provided having a key groove structure for positioning a lower portion of the reactor core tank 4 relative to the reactor vessel 2 and enters the lower plenum 8.

Then, in the lower plenum 8, while the coolant 1 proceeds toward the center of the lower plenum 8 along the inner surface 9 thereof, the flow direction is turned along the outer circumferential surface 233 of the connecting plate flow guide 231 so that the coolant 1 flows up toward the reactor core 13. Further, the coolant 1 that has passed between the inner surface 9 of the lower plenum 8 and the connecting plate flow guide 231 is also turned along the outer peripheral surface 243 of the lower reactor core strut flow guide 241 so as to flow up toward the reactor core 13.

Thus, the coolant 1 that has entered the lower plenum 8 flows up along the connecting plate flow guide 231 and the lower reactor core strut flow guide 241 and no impingement of the coolant 1 occurs in the central portion of the lower plenum 8. Hence, the coolant 1 flows in the reactor core 13 uniformly all the time and also the flow is rectified so as to suppress the promotion of the turbulent vortices and the separating vortices and thereby pressure loss of the flow of the coolant 1 can be reduced.

Also, by the circumferential directional flow suppressing member 232 provided on the outer circumferential surface 233 of the connecting plate flow guide 231, a portion of the coolant 1 flowing up along the outer circumferential surface 233 is prevented from flowing in the circumferential direction of the connecting plate flow guide 231 so that the flow is rectified and promotion of the turbulent vortices and the separating vortices can be prevented.

It is to be noted that, in the present sixth embodiment, the shapes of the connecting plate flow guide 231 and the lower reactor core strut flow guide 241 are not limited to those illustrated and described above and any shape may be employed if it can avoid impingement of the coolant 1 that flows in the lower plenum 8 from different directions and turn the coolant 1 to flow up toward the reactor core 13.

Also, the lower reactor core strut flow guide 241 may be formed in a gradually contracting cylindrical shape like the connecting plate flow guide 231. Further, the lower reactor core strut flow guide 241 may have the outer peripheral surface 243 provided with a member of a shape like the circumferential directional flow suppressing member 232.

Also, the connecting plate flow guide 231 may be provided above the upper connecting plate 11. By so providing the connecting plate flow guide 231, the flow of the coolant 1 is rectified and generation and promotion of the turbulent vortices and the separating vortices can be prevented.

Seventh Embodiment

Figure 13:
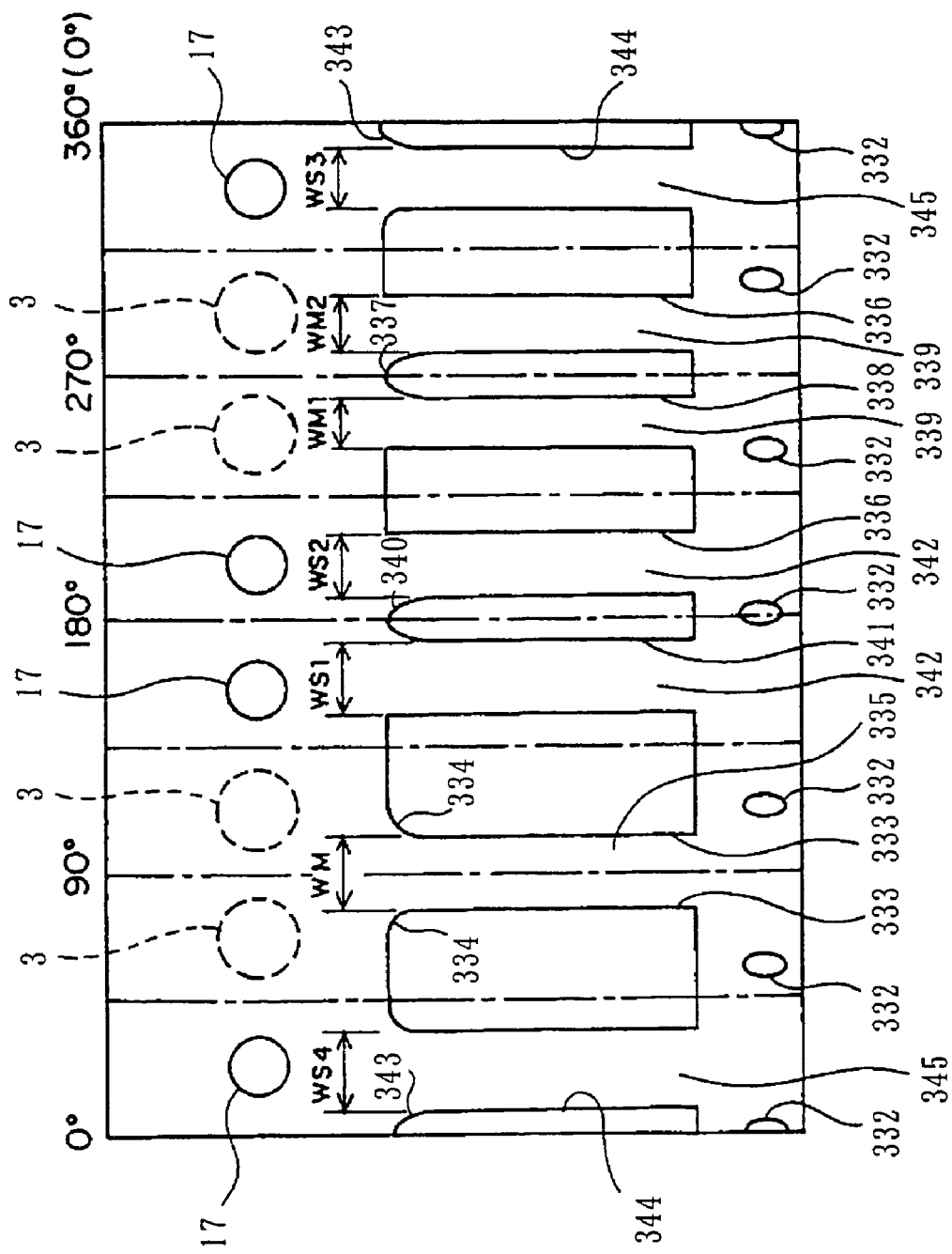
FIG. 13 is a development view of an outer circumferential surface of a reactor core tank of a nuclear reactor internal structure of a seventh embodiment according to the present invention.

FIG. 13 is a development view for explaining the structure of the downcomer portion of a nuclear reactor of a seventh embodiment according to the present invention, wherein an outer circumferential surface of the reactor core tank 4, as shown in FIG. 1, of a cylindrical shape is developed into a flat plane.

Coolant outlet nozzles 17 of a pair are arranged at the symmetric positions relative to the 0° axis and coolant inlet nozzles 3 of a pair are arranged at the symmetric positions relative to the 90° axis. Also, coolant outlet nozzles 17 of another pair are arranged at the symmetric positions relative to the 180° axis and coolant inlet nozzles 3 of another pair are arranged at the symmetric positions relative to the 270° axis.

On the outer circumferential surface of the reactor core tank 4, two thermal insulators 333 of an approximately rectangular shape are arranged at the symmetric positions relative to the 90° axis around which the coolant inlet nozzles 3 are arranged and therebetween, a main flow path 335 having a flow path width WM is formed as one of inter-thermal insulator flow paths. Also, mutually opposed upper corner portions 334 of these thermal insulators 333 are rounded in an arcuate form.

Likewise, two thermal insulators 336 of an approximately rectangular shape are arranged at the symmetric positions relative to the 270° axis around which the coolant inlet nozzles 3 are arranged. On the 270° axis, a rod-like narrow path forming member 338 is provided having its one end on the coolant inlet nozzles 3 side formed in a shape having a streamlined curved surface. Between the two thermal insulators 336, with the narrow path forming member 338 being interposed in the central portion therebetween, a main flow path 339 having a flow path width of the sum of flow path widths WM1 and WM2 is formed as an inter-thermal insulator flow path.

On the other hand, also on the 180° axis around which the coolant outlet nozzles 17 are arranged, a separation suppressing member 341 is provided having its one end 340 on the coolant outlet nozzles 17 side formed in a shape having a streamlined curved surface. Around the separation suppressing member 341 on the 180° axis, an inter-thermal insulator flow path 342 having a flow path width of the sum of flow path widths WS1 and WS2 on both sides of the separation suppressing member 341 is formed.

Also, on the 0° axis around which the coolant outlet nozzles 17 are arranged, a separation suppressing member 344 is provided having its one end on the coolant outlet nozzles 17 side formed in a shape having a streamlined curved surface. Around the separation suppressing member 344 on the 0° axis, an inter-thermal insulator flow path 345 having a flow path width of the sum of flow path widths WS3 and WS4 on both sides of the separation suppressing member 344 is formed.

Here, the flow path width WM of the main flow path 335 is constructed narrower than the flow path width of the inter-thermal insulator flow path 342, that is, the sum of the flow path widths WS1 and WS2 and the flow path width of the inter-thermal insulator flow path 345, that is, the sum of the flow path widths WS3 and WS4, respectively.

Also, the flow path width of the main flow path 339, that is, the sum of the flow path widths WM1 and WM2 is constructed likewise narrower than the flow path width of the inter-thermal insulator flow path 342, 345, respectively.

Figure 14:
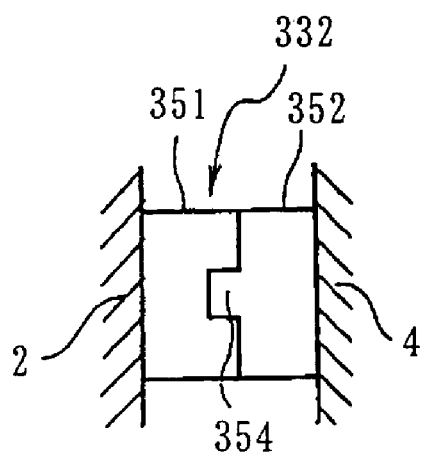
Figure 14:
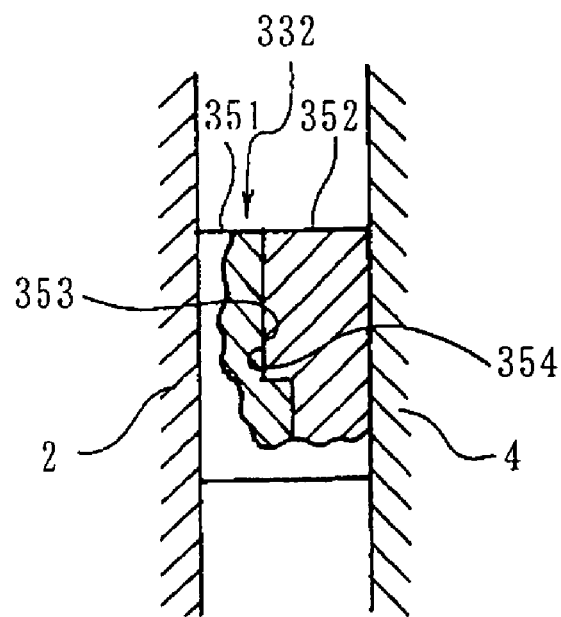
Figure 14:
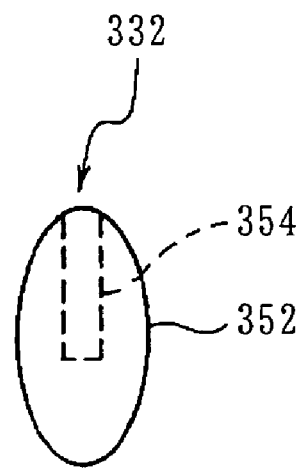

FIGS. 14 to 16 show details of a construction of a radial connection portion 332 used in the present seventh embodiment.

In FIGS. 14(a), (b) and (c) being a plan view, side view and front view, respectively, the radial connection portion 332 is constructed by a radial support portion 351 that is fixed to the reactor vessel 2 by welding and a radial key portion 352 that is fixed to the reactor core tank 4 by welding.

The radial support portion 351, as shown in FIG. 15(a) being a perspective view, is formed having a streamlined oval shape, for example, and a key groove 353 of a rectangular cross sectional shape is formed so as to perpendicularly elongate from an upper portion of the radial support portion 351.

On the other hand, the radial key portion 352, as shown in FIG. 15(b) being a perspective view, is formed having a streamlined oval shape, for example, and a key 354 of an approximately rectangular cross sectional shape having its upper end formed in a streamlined shape is formed so as to protrude from a surface of the radial key portion 352. The key 354 is inserted from above into the key groove 353 to be fitted therein so that the reactor core tank 4 is positioned relative to the reactor vessel 2 to be fixed thereto.

FIG. 16 shows the state where the key 354 is inserted into the key groove 353 to engage with each other. In this state of the engagement, the radial support portion 351 together with the radial key portion 352 forms a construction of which outer peripheral surface is streamlined so as to form a curved surface having no stepped portion.

Next, the flow of the coolant 1 in the nuclear reactor internal structure of the present seventh embodiment will be described with reference to FIG. 13.

The coolant 1 flowing in from the coolant inlet nozzles 3 of one pair existing around the 90° axis joins together so that the flow velocity of the coolant 1 becomes faster and flows down in the downcomer portion 5 through the main flow path 335. The coolant 1 flowing in from the coolant inlet nozzles 3 of another pair existing around the 270° axis also joins together so that the flow velocity of the coolant 1 becomes faster and flows down in the downcomer portion 5 through the main flow path 339. Also, while a portion of the coolant 1 flowing in from the coolant inlet nozzles 3 disperses in the circumferential direction, it flows down through the inter-thermal insulator flow paths 345, 342 around the 0° axis and the 180° axis.

The main flow paths 335, 339 have the flow path width narrower than the inter-thermal insulator flow paths 345, 342 and hence in the state that the flow velocity there becomes sufficiently slow so that no substantial influence is given on generation of a swirling flow, the flow enters the lower plenum 8. Also, as to the coolant 1 flowing in the main flow path 335, as the upper corner portion 334 of the thermal insulator 333 is formed in the rounded shape, even if the coolant 1 impinges on this corner portion, it flows down through the main flow path 335 with no separating flow being generated.

Further, as the respective end portions 337, 340, 343 of the narrow path forming member 338 and the separation suppressing members 341, 344 are formed in the streamlined shape, the flow of the coolant 1 is rectified so that the coolant 1 flows down without occurrence of the separation.

Then, the coolant 1 that has reached the radial connection portion 332, while the separation is being suppressed by the streamlined shape of the radial connection portion 332, flows in the lower plenum 8.

In this way, as the radial connection portion 332 is formed having the streamlined shape, even if the coolant 1 flowing down in the downcomer portion 5 impinges on the radial connection portion 332, no separating flow is generated and the separating vortices can be prevented from being generated downstream thereof.

Further, in order to suppress the flow rate immediately below the coolant inlet nozzles 3, the flow path of the main flow path 335 is made narrower and also the flow path of the main flow path 339 is made narrower by the narrow path forming member 338. Thereby, the impinging flow is mitigated, the flow rate in the 0° axis and 180° axis is increased and the flow rate distribution in the circumferential direction can be made uniform.

Eighth Embodiment

A nuclear reactor internal structure of an eighth embodiment according to the present invention has a radial connection portion of a structure modified from the structure of the radial connection portion of the seventh embodiment.

Figure 17:
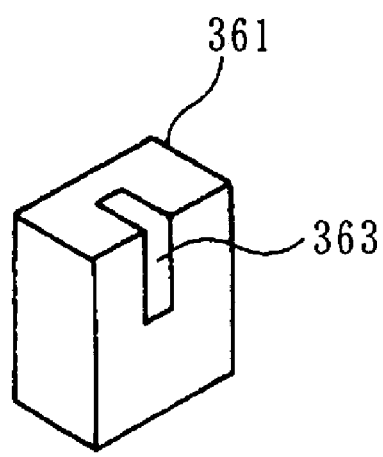
Figure 17:
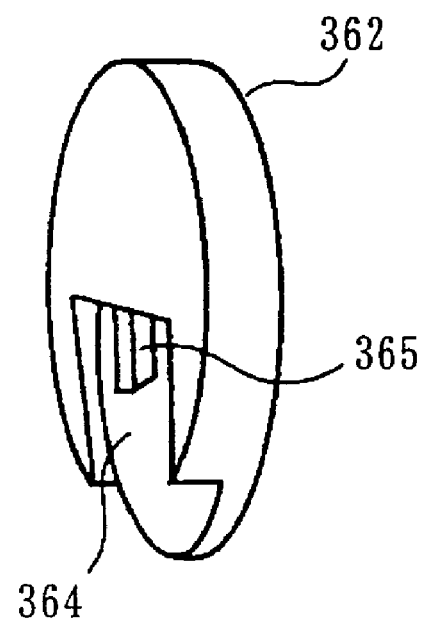

That is, as shown in FIG. 17(a) being a perspective view, a radial support portion 361 that is to be fixed to the reactor vessel 2 is the same as conventionally used in which a key groove 363 of an approximately rectangular cross sectional shape is formed elongating perpendicularly from an upper portion of the radial support portion 361. On the other hand, as shown in FIG. 17(b) being a perspective view, a radial key portion 362 that is to be fixed to the reactor core tank 4 is of an approximately oval shape having its lower portion provided with a recess portion 364 of a rectangular shape. This recess portion 364 is formed in such a shape that, when the radial key portion 362 is brought into engagement with the radial support portion 361, an upper surface and side surface of the radial support portion 361 are covered by the radial key portion 362. At an upper central portion of the recess portion 364, a key 365 of an elongating rectangular cross sectional shape is provided protruding in the recess portion 364 so that the key 365 is inserted into the key groove 363 to be fitted therein.

Figure 18:
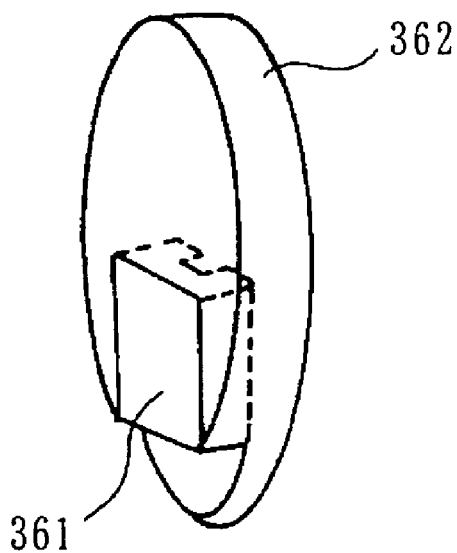
FIG. 18 is a perspective view of the radial connection portion of FIG. 17.

In this way, as the radial key portion 362 is fixed to the conventional radial support portion 361 of the rectangular shape to be fitted therein, by making only the radial key portion 362 to be fixed to the reactor core tank 4 in the streamlined shape, the radial support portion 361 can be covered by the radial key portion 362, as shown in FIG. 18 being a perspective view. Thereby, even in an existing nuclear reactor, generation of the separating vortices can be suppressed and variation in the flow can be suppressed.

It is to be noted that, in the above-mentioned eighth embodiment, while the radial connection portion 332 is formed in the approximately oval shape, the shape is not limited thereto but may be of any streamlined shape, a waterdrop shape for example, effective for suppressing occurrence of the separation corresponding to the flow velocity of the coolant 1 that impinges on the radial connection portion 332.

Also, while the main flow path 335 is made narrower by making the thermal insulators 333 on both sides thereof wider, the same member as the narrow path forming member 338 on the 270° axis may be provided instead so that the flow path is made narrower.

What is claimed is:

1. A nuclear reactor internal structure of a nuclear reactor, comprising:
    a coolant inlet nozzle that receives a coolant;
    a pressure vessel defining a lower plenum at a bottom portion thereof;
    a reactor core arranged in said pressure vessel;
    a reactor core tank arranged around said reactor core;
    a downcomer portion of an annular shape defined between said pressure vessel and said reactor core tank, such that the coolant introduced from said coolant inlet nozzle flows down said downcomer portion perpendicularly from said coolant inlet nozzle without dispersing in a circumferential direction of said downcomer portion;
    a radial key portion provided in said downcomer portion for fixing said reactor core tank relative to said pressure vessel; and
    a connecting plate provided in said lower plenum below said downcomer portion, said connecting plate having a rim portion, provided with a plurality of holes, and a ring portion provided outside the rim portion, an outermost peripheral edge of said ring portion including an arcuate portion, having a constant radius from a center of the connecting plate as to an entire length of the arcuate portion, and a cut-off portion, provided adjacent said arcuate portion, such that the coolant that has passed through said downcomer portion, between said connecting plate and said pressure vessel, and into said lower plenum forms a main flow flowing toward the center of said lower plenum.

2. A nuclear reactor internal structure as claimed in claim 1, wherein said radial key portion is arranged in said downcomer at a position 90° apart from the main flow in said downcomer, the flow of the coolant introduced from said coolant inlet nozzle partly deviates from the perpendicular direction in said downcomer portion to disperse in the circumferential direction of said downcomer portion and then flows down perpendicularly to impinge on said radial key portion to be separated there and further flows below said connecting plate through between the inner surface of said lower plenum and the outermost peripheral edge of said ring portion to form a separating flow flowing toward the direction deviating from the center of said lower plenum and the outermost peripheral edge of said ring portion is formed in an asymmetric shape relative to the direction of generation of the separating flow.

3. A nuclear reactor internal structure as claimed in claim 1 or 2, wherein the outermost peripheral edge of the ring portion includes a first arcuate portion that defines a first flow area with said pressure vessel to obstruct a part of the main flow, and a first cut-off portion, formed adjacent to the arcuate portion, that defines a second flow area, larger than the first flow area, with said pressure vessel.

4. A nuclear reactor internal structure as claimed in claim 2, wherein the outermost peripheral edge of the ring portion includes an arcuate portion that defines a first flow area with said pressure vessel to obstruct a part of the separating flow, and a cut-off portion, formed adjacent to the arcuate portion, that defines a second flow area, larger than the first flow area, with said pressure vessel.

5. A nuclear reactor internal structure as claimed in claim 3, wherein the outermost peripheral edge of the ring portion includes a second arcuate portion that defines a third flow area with said pressure vessel to obstruct a part of the separating flow, and a second cut-off portion, provided adjacent to the second arcuate portion, that defines a fourth flow area, larger than the third flow area, with said pressure vessel.

* * * * *